US012603100B2

(12) United States Patent
Sconza et al.

(10) Patent No.: US 12,603,100 B2
(45) Date of Patent: Apr. 14, 2026

(54) SYSTEM AND METHOD FOR OPTIMIZED AUDIO MIXING

(71) Applicant: Shure Acquisition Holdings, Inc., Niles, IL (US)

(72) Inventors: Justin Joseph Sconza, Chicago, IL (US); Guillaume Lamy, Chicago, IL (US); Bijal Joshi, Elk Grove Village, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 165 days.

(21) Appl. No.: 18/397,693

(22) Filed: Dec. 27, 2023

(65) Prior Publication Data

US 2024/0221778 A1 Jul. 4, 2024

Related U.S. Application Data

(60) Provisional application No. 63/478,297, filed on Jan. 3, 2023.

(51) Int. Cl.
*G10L 25/60* (2013.01)
*G10L 21/0208* (2013.01)
*G10L 25/84* (2013.01)

(52) U.S. Cl.
CPC .......... *G10L 25/60* (2013.01); *G10L 21/0208* (2013.01); *G10L 25/84* (2013.01)

(58) Field of Classification Search
USPC ......................................... 704/233, 270, 275
See application file for complete search history.

(56) References Cited

U.S. PATENT DOCUMENTS 4,658,425 A 4/1987 Julstrom
5,297,210 A 3/1994 Julstrom
(Continued)

FOREIGN PATENT DOCUMENTS

EP 1830348 9/2007
EP 2594087 5/2013
(Continued)

OTHER PUBLICATIONS

International Search Report and Written Opinion for PCT/US2023/086087 dated Mar. 28, 2024, 11 pp.
(Continued)

*Primary Examiner* — Leonard Saint-Cyr
(74) *Attorney, Agent, or Firm* — Alston & Bird LLP

(57) ABSTRACT

Systems and methods are described herein for receiving, at a plurality of audio channels, respective audio signals captured by one or more microphones; based on a speech quality determination for each signal, identifying, in real time, a first subset of the audio channels as capturing speech audio, and a second subset of the audio channels as capturing noise audio, wherein the first subset comprises one or more audio channels and the second subset comprises one or more other audio channels; generating, using a first mixer, a mixed audio output that includes the signals received at the one or more audio channels; generating, using a second mixer, a noise mix that includes the signals received at the one or more other audio channels; and removing off-axis noise from the mixed audio output by applying, to that output, a mask determined based on the noise mix.

20 Claims, 9 Drawing Sheets

(56) References Cited

U.S. PATENT DOCUMENTS

| | | | | |
|---|---|---|---|---|
| 7,076,433 | B2 | 7/2006 | Ito | |
| 7,778,425 | B2 | 8/2010 | Kajala | |
| 7,881,480 | B2 | 2/2011 | Buck | |
| 7,983,907 | B2 | 7/2011 | Erik | |
| 8,477,962 | B2 | 7/2013 | Cui | |
| 8,554,556 | B2 | 10/2013 | Yu | |
| 8,644,477 | B2 | 2/2014 | Gilbert | |
| 8,908,883 | B2 | 12/2014 | Bai | |
| 9,008,329 | B1 | 4/2015 | Mandel | |
| 9,226,070 | B2 | 12/2015 | Hyun | |
| 9,747,920 | B2 | 8/2017 | Ayrapetian | |
| 9,805,734 | B2 | 10/2017 | Sugiyama | |
| 9,818,425 | B1 | 11/2017 | Ayrapetian | |
| 10,229,698 | B1 | 3/2019 | Chhetri | |
| 10,468,020 | B2 | 11/2019 | Pandey | |
| 11,302,347 | B2 | 4/2022 | Penniman | |
| 11,398,241 | B1 | 7/2022 | Mansour | |
| 2007/0160230 | A1 | 7/2007 | Nakagomi | |
| 2009/0279715 | A1* | 11/2009 | Jeong | H04R 3/005 381/92 |
| 2013/0030801 | A1* | 1/2013 | Fallat | H04R 3/005 704/226 |
| 2014/0355776 | A1* | 12/2014 | Park | G10L 21/0208 381/71.2 |
| 2019/0228790 | A1* | 7/2019 | Park | G01S 3/8083 |
| 2019/0304427 | A1 | 10/2019 | Kemmerer | |
| 2021/0020154 | A1* | 1/2021 | Seagriff | G10K 11/17881 |
| 2021/0020155 | A1* | 1/2021 | Seagriff | G10K 11/17854 |
| 2021/0383785 | A1 | 12/2021 | Sibbald | |

FOREIGN PATENT DOCUMENTS

| | | |
|---|---|---|
| JP | 2008261923 | 10/2008 |
| JP | 5293952 | 9/2013 |

OTHER PUBLICATIONS

Zhang, et al., “A Study on Reference Microphone Selection for Multi-Microphone Speech Enhancement,”IEEE/ACM Transactions on Audio, Speech, and Language Processing, 2020, 12 pp.

Nakatani, et al., “Integrating DNN-Based and Spatial Clustering-Based Mask Estimation for Robust MVDR Beamforming,” 2017 IEEE International Conference on Acoustics, Speech and Signal Processing (ICASSP), 5 pp.

Hu, et al., “Monaural Speech Segregation Based on Pitch Tracking and Amplitude Modulation,” IEEE Transactions on Neural Networks, vol. 15, No. 5, Sep. 2004, 16 pp.

Karakütük, et al., “Adaptive interference cancellation using microphone arrays,” 2014 22nd Signal Processing and Communications Applications Conference (SIU), Trabzon, Turkey, 2014, 4 pp.

* cited by examiner

SYSTEM AND METHOD FOR OPTIMIZED AUDIO MIXING

CROSS-REFERENCE

This application claims priority to U.S. Provisional Patent App. No. 63/478,297, filed on Jan. 3, 2023, the contents of which are incorporated by reference herein in their entirety.

TECHNICAL FIELD

This disclosure generally relates to mixing of audio signals captured by a microphone system. In particular, the disclosure relates to systems and methods for optimizing audio mixing by using noise source removal and voice activity detection techniques to reject unwanted audio and maximize signal-to-noise ratio.

BACKGROUND

Audio environments, such as conference rooms, boardrooms, and other meeting rooms, video conferencing settings, and the like, can involve the use of multiple microphones or microphone array lobes for capturing sound from various audio sources. The audio sources may include human speakers, for example. The captured sounds may be disseminated to a local audience in the environment through speakers (for sound reinforcement) and/or to others located remotely (such as via a telecast, webcast, or the like). For example, persons in a conference room may be conducting a conference call with persons at a remote location. Each of the microphones or array lobes may form a channel. The captured sound may be input as multi-channel audio and provided or output as a single mixed audio channel.

Typically, the captured sounds include speech from the human speakers, as well as unwanted audio, like errant non-voice or non-human noises in the environment (such as sudden, impulsive, or recurrent sounds like shuffling of papers, opening of bags and containers, chewing, sneezing, coughing, typing, etc.) and/or errant voice noises, such as side comments, side conversations between other persons in the environment, etc. To minimize unwanted audio in the captured sound, voice activity detection (VAD) algorithms and/or automixers may be applied to the channel of a microphone or array lobe. The VAD technique is used in speech processing to detect the presence or absence of human speech or voice in an audio stream. However, such detection can create delays, especially when used in real-time scenarios, which can lead to front end clipping of speech or voice. An automixer can automatically reduce the strength of a particular microphone's audio input signal to mitigate the contribution of background, static, or stationary noise, when the microphone is not capturing human speech or voice. However, complete, or near complete, rejection of unwanted audio may compromise the performance of typical automixers, since automixers typically rely on relatively simple rules to select which channel to "gate" on, such as, e.g., first time of arrival or highest amplitude at a given moment in time. Noise reduction techniques may also be used to reduce certain background, static, or stationary noise, such as fan and HVAC system noises. However, such noise reduction techniques are not ideal for reducing or rejecting errant noises, unwanted speech, and other spurious noise interference.

SUMMARY

The techniques of this disclosure provide systems and methods designed to, among other things: (1) enhance audio mixing for one or more microphones in the case of spurious noise interference and other noisy situations; (2) optimize gating decisions for a plurality of microphone channels by using voice activity detection to separate noisy lobes from lobes having speech or voice audio, and (3) remove unwanted audio sources from a mixed audio output based on a mix of the noisy lobes.

One exemplary embodiment includes a method using at least one processor in communication with one or more microphones, the method comprising: receiving, at each of a plurality of audio channels, a respective one of a plurality of audio signals captured by the one or more microphones; based on a speech quality determination for each of the plurality of audio signals, identifying, in real time, a first subset of the plurality of audio channels as capturing speech audio, and a second subset of the plurality of audio channels as capturing noise audio, wherein the first subset comprises one or more audio channels from the plurality of audio channels, and the second subset comprises one or more other audio channels from the plurality of audio channels; generating, using a first mixer, a mixed audio output that includes the audio signals received at the one or more audio channels in the first subset; generating, using a second mixer, a noise mix that includes the audio signals received at the one or more other audio channels in the second subset; and removing off-axis noise from the mixed audio output by applying, to the mixed audio output, a mask determined based on the noise mix.

Another exemplary embodiment includes a system comprising: at least one microphone configured to capture a plurality of audio signals from one or more audio sources and provide each of the plurality of audio signals to a respective one of a plurality of audio channels; a detector communicatively coupled to the at least one microphone and configured to determine a speech quality of each of the plurality of audio signals; a selector communicatively coupled to the at least one microphone and the detector, the selector configured to identify, based on the speech quality for each of the plurality of audio signals, a first subset of the plurality of audio channels as capturing speech audio, and a second subset of the plurality of audio channels as capturing noise audio, wherein the first subset comprises one or more audio channels from the plurality of audio channels, and the second subset comprises one or more other audio channels from the plurality of audio channels; a first mixer configured to generate a mixed audio output using the audio signals received at the one or more audio channels in the first subset; a second mixer configured to generate a noise mix using the audio signals received at the one or more other audio channels in the second subset; and a source remover configured to remove off-axis noise from the mixed audio output by applying, to the mixed audio output, a mask determined based on the noise mix.

Another exemplary embodiment includes a digital signal processing (DSP) component having a plurality of audio channels for respectively receiving a plurality of audio signals captured by one or more microphones, the DSP component configured to: based on a speech quality determination for each of the plurality of audio signals respectively received at the plurality of audio channels, identify, in real time, a first subset of the plurality of audio channels as capturing speech audio, and a second subset of the plurality of audio channels as capturing noise audio, wherein the first subset comprises one or more audio channels from the plurality of audio channels, and the second subset comprises one or more other audio channels from the plurality of audio channels; generate, using a first mixer, a mixed audio output using the audio signals received at the one or more audio channels in the first subset; generate, using a second mixer, a noise mix using the audio signals received at the one or more other audio channels in the second subset; and remove off-axis noise from the mixed audio output by applying, to the mixed audio output, a mask determined based on the noise mix.

Another exemplary embodiment includes a non-transitory computer-readable medium comprising instructions that, when executed by at least one processor, cause the at least one processor to perform: receiving, at each of a plurality of audio channels, a respective one of a plurality of audio signals captured by one or more microphones; based on a speech quality determination for each of the plurality of audio signals, identifying, in real time, a first subset of the plurality of audio channels as capturing speech audio, and a second subset of the plurality of audio channels as capturing noise audio, wherein the first subset comprises one or more audio channels from the plurality of audio channels, and the second subset comprises one or more other audio channels from the plurality of audio channels; generating, using a first mixer, a mixed audio output that includes the audio signals received at the one or more audio channels in the first subset; generating, using a second mixer, a noise mix that includes the audio signals received at the one or more other audio channels in the second subset; and removing off-axis noise from the mixed audio output by applying, to the mixed audio output, a mask determined based on the noise mix.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
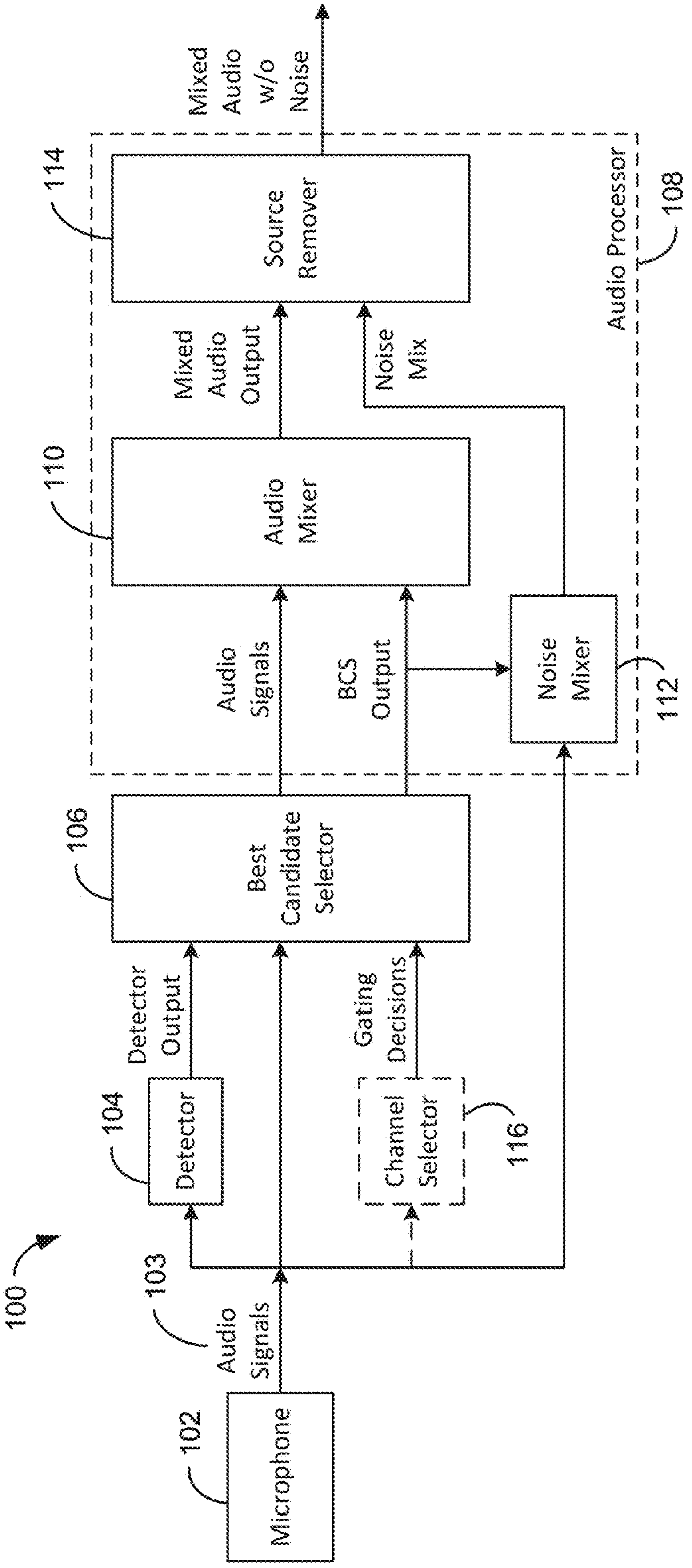
FIG. 1 is a schematic diagram of an exemplary audio system including a best candidate selector, an audio mixer, a noise mixer, and a source remover, in accordance with one or more embodiments.

In a typical automixing application (either with separate microphone units or using steered audio lobes from a microphone array), desired audio and unwanted noises may occur in the same environment and may be included in all microphones and/or lobes, due to imperfect acoustic polar patterns of the microphones and/or lobes. For example, a microphone or array microphone lobe directed towards a desired audio source may pick up noise interference in addition to the desired audio. The noise interference may be unwanted audio that is generated off-axis by a nearby audio source, such that it bleeds or leaks into the desired audio. This may present problems with VAD detection capability (both on an individual channel and collective channel basis), appropriate automixer channel selection (which attempts to avoid errant noises while still selecting the channel(s) that contain voice), and the suppression of errant noises in lobes that are gated on because they contain speech/voice. Thus, while some existing systems combine automixing and VAD techniques, such systems are not inherently capable of rejecting unwanted audio, especially in real-time communication scenarios or for use with in-room sound reinforcement. Accordingly, there is a need to improve rejection of unwanted audio and maximize signal-to-noise ratio in audio mixing applications.

Systems and methods are provided herein for enhancing audio mixing for one or more microphones based on gating decisions optimized by using voice activity detection to separate noisy lobes from lobes having speech or voice audio, and removal of unwanted audio sources from a mixed audio output using a mix of the noisy lobes. In embodiments, a plurality of audio signals captured by one or more microphones, or microphone lobes, for one or more audio sources may be provided to respective audio channels for the one or more microphones (or a beamformer coupled thereto). A voice activity detector ("VAD"), or the like, may be used to determine a harmonicity value for the audio signal provided to each channel, or other indicator that identifies the presence or absence of human speech (or voice) in each audio signal. In general, harmonicity values may be effective voice indicators when both speech audio and noise interference are present, but less effective in quiet conditions, where the VAD tends to find similar harmonic levels for all lobes across all channels. In embodiments, a selector may be configured to identify the channel(s) that are most likely to contain, or be the best candidate(s) for, speech audio based on corresponding harmonicity values or other VAD output, and identify the remaining channels as containing noise audio and/or having an absence of speech audio. Based on these identifications by the selector, an audio mixer may gate on the best candidate channel(s) and/or gate off the remaining channel(s), and generate a mixed audio output using the audio signals received on the channels that are gated on. In addition, since "in channel" voice and/or "in channel" noise may sometimes bleed or leak into other channels and make its way into the mixed audio output, a source remover may be used to remove any "off-axis" noise from the mixed audio output, for example, by using a mask that is based on a mix of the audio signals received at the noisy channels.

As used herein, the terms "lobe" and "microphone lobe" refer to an audio beam generated by a given microphone array (or array microphone) to pick up audio signals at a select location, such as the location towards which the lobe is directed. While the techniques disclosed herein are described with reference to microphone lobes generated by array microphones, the same or similar techniques may be utilized with other forms or types of microphone coverage (e.g., a cardioid pattern, etc.) and/or with microphones that are not array microphones (e.g., a handheld microphone, boundary microphone, lavalier microphones, etc.). Thus, the term "lobe" is intended to cover any type of audio beam or coverage.

FIG. 1 illustrates a schematic diagram of an audio system 100 that may be used to optimize audio mixing in a given environment, or otherwise implement one or more of the techniques described herein, in accordance with embodiments. Environments such as conference rooms or other meeting spaces may utilize the audio system 100 to facilitate communication with persons at a remote location and/or for audio reinforcement at the same location, for example.

As shown, the audio system 100 (also referred to herein as "system") comprises a microphone 102 for capturing sounds from one or more audio sources in the environment and generating a plurality of audio signals 103 based on the captured sounds. The audio sources may be human talkers participating in a conference call or other meeting or event (or "local participants"), and the sounds may be human voice or speech spoken by the local participants or music or other sounds generated by the same. In a common situation, the local participants may be seated in chairs at a table, although other configurations and locations of the audio sources are contemplated and possible. The audio sources may also include one or more noise sources, such that the sounds captured by the microphone 102 may also be noise, including non-voice human noise (e.g., sneezing, coughing, chewing, etc.), non-human noise (e.g., background noise from fans, HVAC system, or the like, spurious noises such as typing, rustling of papers, opening of chip bags or other food containers, typing, etc.), and human voice noise (e.g., side comments or conversations, audio from remote participants playing on an audio speaker in the environment, etc.).

Referring additionally to FIGS. 2 to 5, the audio system 100 further comprises a detector 104 for determining a speech or voice quality of each of the plurality of audio signals 103, and a selector 106 for identifying, based on said speech quality determination, which of the plurality of audio signals 103 are most likely to contain, or be the best candidates for, speech audio. As shown, the system 100 also comprises an audio processor 108 that is communicatively coupled to the selector 106 for receiving a best candidate selection ("BCS") output therefrom. The audio processor 108 can include a first mixer 110 for generating a mixed audio output using the audio signals identified as speech audio, and a second mixer 112 for generating a noise mix using the remaining audio signals. The audio processor 108 may further include a source remover 114 for removing off-axis noise from the mixed audio output using a mask determined based on the noise mix. In some embodiments, the audio system 100 further includes a channel selector 116 for providing preliminary gating decisions to the selector 106.

In various embodiments, the system 100 may also include various components not shown in FIG. 1, such as, for example, one or more loudspeakers, display screens, computing devices, and/or cameras. In addition, one or more of the components in the system 100 may include one or more digital signal processors or other processing components, controllers, wireless receivers, wireless transceivers, etc. It should be understood that the components shown in FIG. 1 are merely exemplary, and that any number, type, and placement of the various components in the system 100 are contemplated and possible.

One or more components of the audio system 100 may be in wired or wireless communication with one or more other components of the system 100. For example, the microphone 102 may transmit the plurality of audio signals 103 to the audio processor 108, the selector 106, and/or the detector 104, or a computing device comprising one or more of the same, using a wired or wireless connection. In some embodiments, one or more components of the audio system 100 may communicate with one or more other components of the system 100 via a suitable application programming interface (API). For example, one or more APIs may enable the detector 104 to transmit audio and/or data signals to the selector 106, enable the selector 106 to transmit audio and/or data signals to the audio processor 108, and/or enable the components of the audio processor 108 to transmit audio and/or data signals between themselves.

In some embodiments, one or more components of the audio system 100 may be combined into, or reside in, a single unit or device. For example, all of the components of the audio system 100 may be included in the same device, such as the microphone 102, or a computing device that includes the microphone 102. As another example, at least one of the detector 104 or the selector 106 may be included in, or combined with, the microphone 102, while the channel selector 116 may be combined with the audio processor 108 or otherwise reside in a separate device. As another example, the selector 106 may be combined with the audio processor 108 in a first computing device, while the detector 104 may be combined with the microphone 102 in a second device. In some embodiments, the noise mixer 112 and the source remover 114 may be combined into a single component that is included in or separate from the audio processor 108. In other embodiments, certain components of the audio processor 108 may be separated into different devices, though shown together in FIG. 1. For example, at least one of the audio mixer 110, the noise mixer 112, or the source remover 114 may be combined with the microphone 102 or included in a computing device that is separate from the audio processor 108. In some embodiments, the audio system 100 may take the form of a cloud based system or other distributed system, such that the components of the system 100 may or may not be physically located in proximity to each other.

Though only one microphone is shown in FIG. 1, the microphone 102 can include one or more of an array microphone, a non-array microphone (e.g., directional microphones such as lavalier, boundary, etc.), or any other type of audio input device capable of capturing speech and other sounds. The type, number, and placement of microphone(s) in a particular environment may depend on the locations of audio sources, listeners, physical space requirements, aesthetics, room layout, stage layout, and/or other considerations. Thus, the microphone 102 shown in FIG. 1 may be placed in any suitable location, including on a wall, ceiling, table, lectern, and/or any other surface in the environment, and may conform to a variety of sizes, form factors, mounting options, and wiring options to suit the needs of the particular environment. Moreover, the audio system 100 may work in conjunction with any type and any number of microphones 102, including one or more microphone transducers (or elements), one or more microphone arrays, one or more directional microphones, or any combination thereof. As an example, the microphone 102 may include, but is not limited to, SHURE MXA310, MX690, MXA910, and the like.

Figure 6:
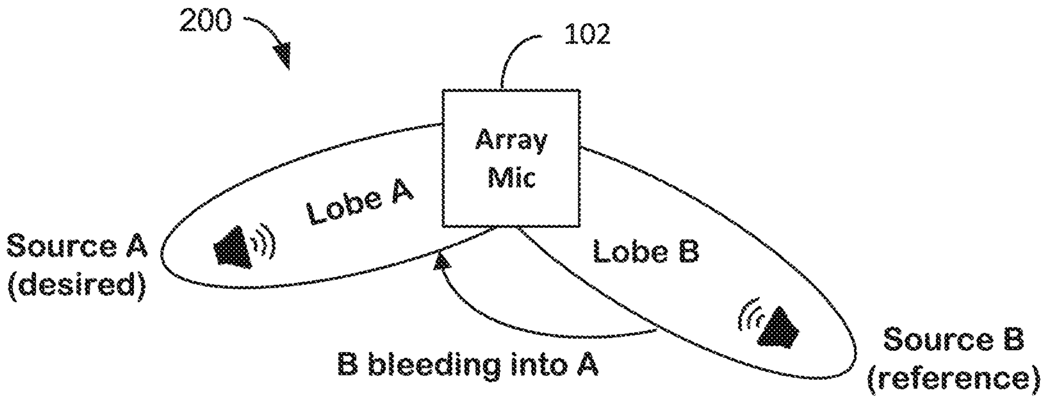
FIG. 6 is a schematic diagram of an exemplary environment having lobes deployed by an array microphone of the system of FIG. 1, in accordance with one or more embodiments.

In general, the microphone 102 can be configured to detect sound in the environment and convert the sound to an audio signal. In some embodiments, the audio signal detected, or captured, by the microphone 102 may be processed by a beamformer (not shown) to generate one or more beamformed audio signals, or otherwise direct an audio pick-up beam, or microphone lobe, towards a particular location in the environment (e.g., as shown in FIG. 6). In such cases, the microphone 102 may be configured to point or direct a plurality of microphone lobes towards various locations, or at various angles relative to the microphone 102. The beamformer may be included in the microphone 102 or may be a standalone device communicatively coupled to the microphone 102. When multiple microphone lobes are used, the beamformer may include a plurality of audio channels, and each channel may be assigned to a respective lobe for individually receiving the audio signal captured by that lobe. For example, the microphone 102 can be configured to capture a plurality of audio signals 103 and provide each of the plurality of audio signals 103 to a respective one of a plurality of audio channels at the beamformer.

In the illustrated embodiment, the microphone 102 is configured to generate up to eight microphone lobes and thus, has at least eight audio channels. Other numbers of channels/lobes (e.g., six, four, etc.) are also contemplated, as will be appreciated. In some embodiments, the total number of lobes may be fixed (e.g., at eight). In other embodiments, the number of lobes may be selectable by a user and/or automatically determined based on the locations of the various audio sources detected by the microphone 102. Similarly, in some embodiments, a directionality and/or location of each lobe may be fixed, such that the lobes always form a specific configuration. In other embodiments, the directionality and/or location of each lobe may be adjustable or selectable based on a user input and/or automatically in response to, for example, detecting a new audio source or movement of a known audio source to a new location.

In some embodiments, the microphone 102 may be configured to use a general or non-directional lobe to detect audio, and upon detecting an audio signal at a given location, the microphone 102 and/or the beamformer may deploy a directed lobe towards the given location for capturing the detected audio signal. In other embodiments, the audio system 100 may not include the beamformer, in which case each of the audio signals 103 captured by the microphone 102 may be provided to the detector 104 directly, or without processing. For example, the microphone 102 may include a plurality of omnidirectional microphones, each configured to capture audio signals 103 using an omnidirectional lobe. In such cases, the plurality of audio signals 103 may still be provided to respective audio channels associated with the audio system 100.

In various embodiments, other components of the audio system 100 may also include a plurality of channels respectively assigned to the plurality of the audio channels of the microphone 102 in order to allow individual processing and/or handling of the audio signal 103 included in each channel, or captured by the corresponding microphone lobe. For example, each of the selector 106, the audio mixer 110, and the noise mixer 112 may be configured to include a plurality of audio channels for respectively receiving the plurality of audio signals 103 and/or a plurality of data channels for providing outputs corresponding to the audio signals 103.

Figure 2:
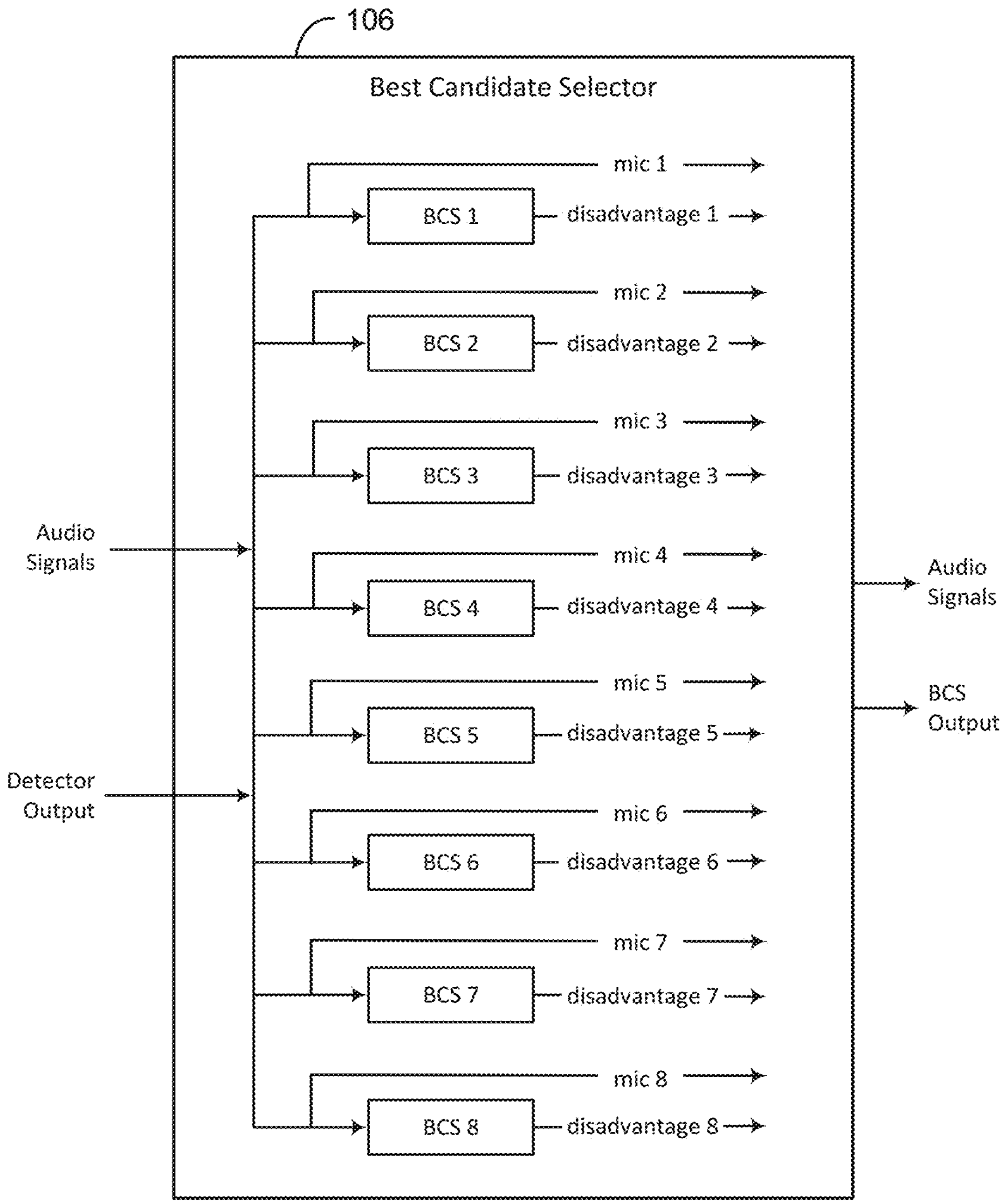
FIG. 2 is a schematic diagram of an exemplary best candidate selector included in the system of FIG. 1, in accordance with one or more embodiments.
Figure 3:
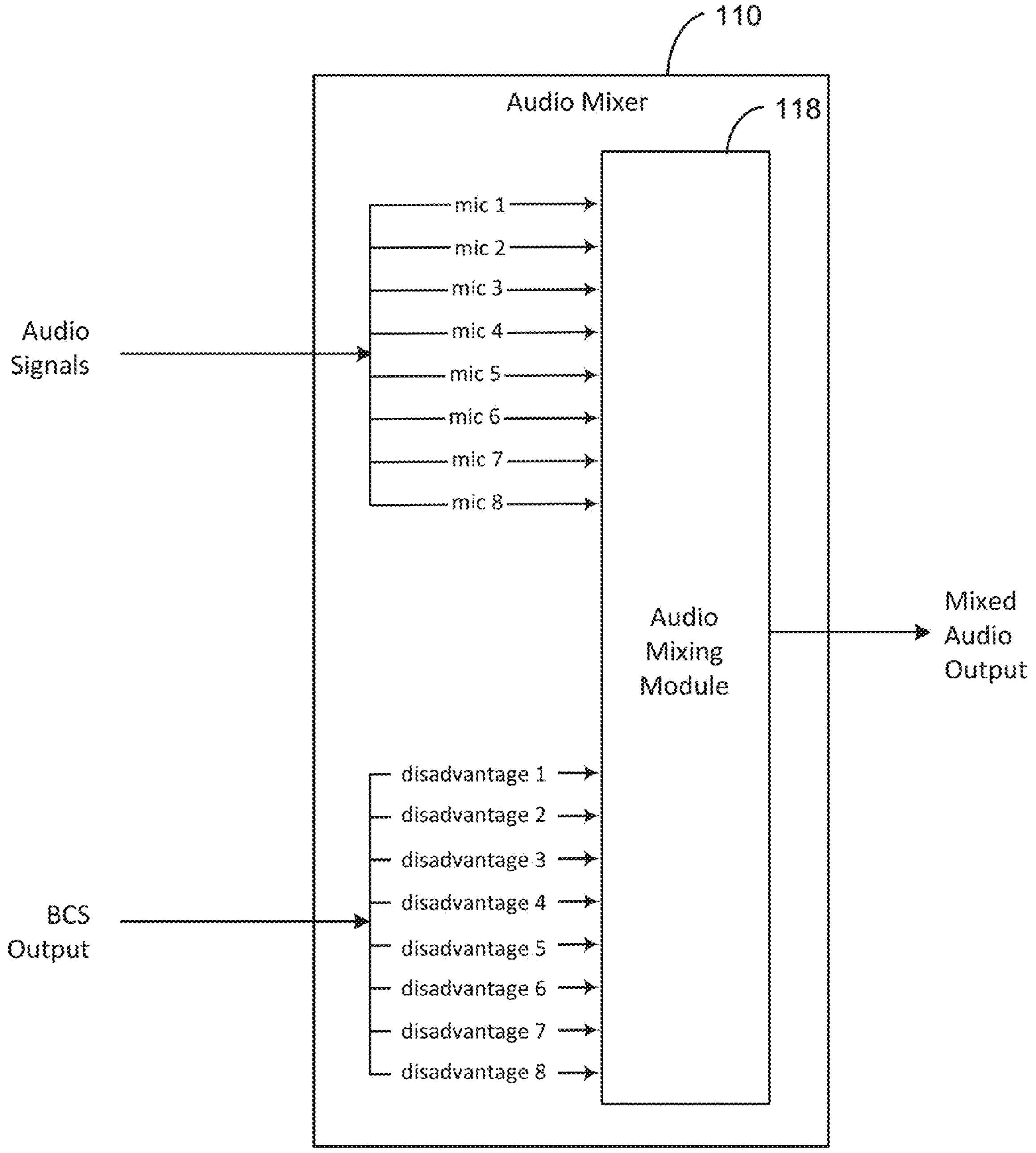
FIG. 3 is a schematic diagram of an exemplary audio mixer included in the system of FIG. 1, in accordance with one or more embodiments.
Figure 4:
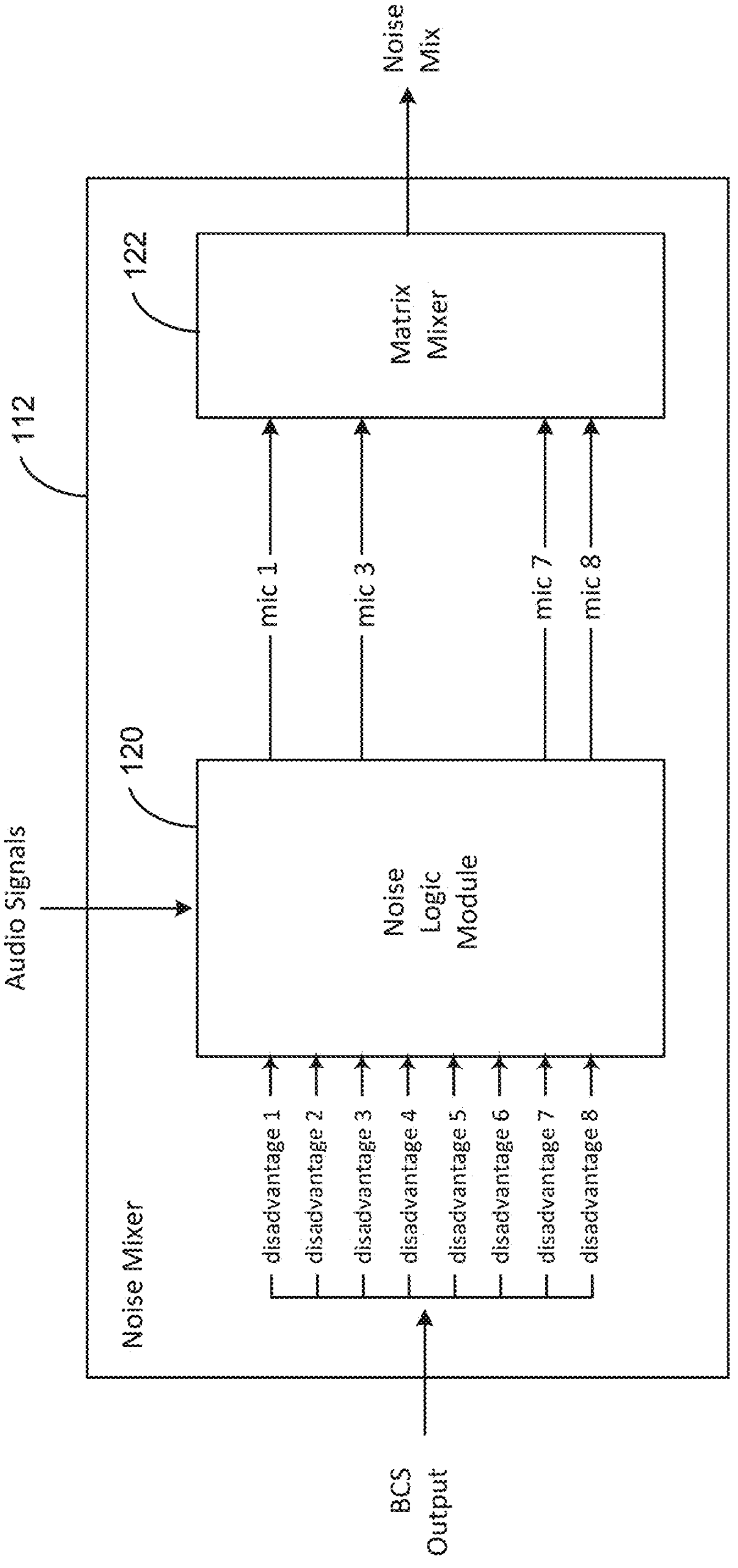
FIG. 4 is a schematic diagram of an exemplary noise mixer included in the system of FIG. 1, in accordance with one or more embodiments.

In particular, as shown in FIG. 2, the selector 106 may include a plurality of input data channels for receiving respective speech quality determinations from the detector 104 for each lobe, or the audio signal 103 captured thereby, and a plurality of output data channels for respectively providing the best candidate selection ("BCS") outcome for each lobe to the audio mixer 110. In some embodiments, the selector 106 may also include a plurality of input audio channels that respectively correspond to the audio channels of the microphone 102 for receiving respective audio signals 103, and a plurality of corresponding output audio channels for respectively providing the plurality of audio signals 103 to the audio mixer 110, as shown. In other embodiments, the selector 106 may receive only the speech quality determinations from the detector 104, and the microphone 102 may provide the plurality of audio signals 103 directly to corresponding audio channels of the audio mixer 110. As shown in FIG. 3, the audio mixer 110 may include a plurality of input audio channels for receiving the plurality of audio signals from the microphone 102 or the selector 106, and a plurality of input data channels for receiving the best candidate selection outcomes from the selector 106. As shown in FIG. 4, the noise mixer 112 may include a plurality of input data channels, also for receiving the best candidate selection outcomes from the selector 106. Likewise, though not shown, the detector 104 may include a plurality of input audio channels that respectively correspond to the plurality of audio channels at the microphone 102 (or the beamformer included therein) in order to receive the audio signal 103 captured by the corresponding microphone lobe. In addition, the detector 104 may include a plurality of corresponding output data channels for providing, to the selector 106, the speech quality determination made for the audio signal 103 captured by the corresponding lobe.

For ease of explanation, the techniques described herein may refer to using the plurality of audio signals 103 captured by the microphone 102, even though the techniques may utilize any type of acoustic source, including beamformed audio signals generated by the beamformer. In addition or alternatively, the plurality of audio signals 103 captured by the microphone 102 may be converted into the frequency domain, in which case, certain components of the audio system may operate in the frequency domain.

The detector 104 can be a voice activity detector ("VAD"), such as a cepstral voice activity detector, or any other type of detector or other component that can determine a voice or speech quality of the audio signals 103 to help differentiate human speech or voice from errant non-voice or non-human noises in the environment. The detector 104 may be configured to use a voice activity detection algorithm or other similar speech processing algorithm to detect the presence or absence of human speech or voice in a given audio signal and make a speech quality determination for the sound captured by that audio signal that indicates whether voice audio or non-voice, or noise, audio is present in the captured sound. As an example, the speech quality determination, or metric, may be a numerical score that indicates a relative strength of the voice activity found in the audio signal (e.g., on a scale of 1 to 5), a binary value that indicates whether voice is found (e.g., "1") or noise is found (e.g., "0") in the audio signal, a harmonicity value that indicates a level of harmonics in the audio signal (e.g., on a scale of 0 to 1, or any other suitable measure. In various embodiments, the detector 104 may be implemented by analyzing the harmonicity or spectral variance of the audio signals 103 using linear predictive coding ("LPC"), applying machine learning or deep learning techniques to detect voice, and/or using well-known techniques such as the ITU G.729 VAD, ETSI standards for VAD calculation included in the GSM specification, or long term pitch prediction. In some embodiments, the detector 104 may be a close proximity microphone, or a microphone placed in close proximity to the desired audio source. In such cases, the speech quality determination may be based on the audio signal captured by the close proximity microphone (e.g., by comparing the close proximity audio to the incoming audio signal).

As shown in FIG. 1, the detector 104 transmits, to the selector 106, an output comprising the speech quality determination for each of the audio signals 103 captured by the microphone 102. As shown in FIG. 2, the speech quality determinations may be provided to corresponding input channels of the selector 106, as described herein. As will be appreciated, each audio signal 103 may be comprised of, or divided into, a plurality of audio frames, such that each audio frame represents a sample of the audio signal 103 (e.g., a digital audio sample) at a particular point in time. The detector 104 may be configured to analyze each of the plurality of audio signals 103 frame by frame, for example, as a given audio frame is received from the microphone 102, and determine a harmonicity value or other speech quality metric for each of the audio frames.

The selector 106 can be a best candidate selector ("BCS"), a channel selector, or any other type of selector or other component that can use the speech quality determinations (or metrics) received from the detector 104 to identify, in real time (or nearly real time), a first subset of the plurality of audio channels, or more specifically, their respective audio signals 103, as capturing speech audio and a second subset of the plurality of audio channels as capturing noise audio. In embodiments, the selector 106 utilizes a best candidate selection algorithm configured to analyze the speech quality metrics (e.g., harmonicity values) obtained for the audio signals 103 to dynamically determine which microphone is, or is most likely to be, in front of the person that is currently talking, or is otherwise the "best candidate" for containing speech audio and thus, should be gated on. For example, the selector 106 and/or said best candidate selection algorithm may use a slope crossing technique to categorize the speech quality metrics based on numeric similarity, or likeness of values, and based thereon, determine which of the audio signals 103 are most likely to contain, or be the best candidates for, speech audio and/or which of the audio signals 103 are most likely to be noise audio, or non-speech audio. In other embodiments, the selector 106 may be configured to use any other suitable technique capable of identifying the best candidate(s) for speech audio from among the plurality of audio signals 103, or otherwise configured to separate noisy channels (or microphone lobes) from those that contain speech audio.

According to embodiments, the slope crossing technique may be an algorithm configured to assess corresponding harmonicity values, or other level of harmonic content, in order to more accurately categorize the audio signals 103 as speech or noise, especially when both speech and noise occur concurrently. In contrast, many existing audio mixing techniques are designed to analyze the timing and energy levels of the audio signals received at their audio channels and will gate on the audio channel that was first to receive the highest energy level, which can cause such systems to pick up errant sounds, instead of speech audio.

As described in more detail below with respect to FIG. 8, the slope crossing algorithm may comprise instructions that, when executed by a processor, cause the selector 106 to, upon obtaining a respective harmonicity value (or other speech quality metric) for each of the plurality of audio signals 103, separate the harmonicity values into a plurality of groups based on numeric similarity; identify a first group of the plurality of groups as comprising the highest harmonicity values; and identify, as speech audio, the audio signals corresponding to the harmonicity values in the first group. Further details on the slope crossing algorithm, including how the harmonicity values may be grouped based on numeric similarity, are described below with respect to FIGS. 9 and 10. As will be appreciated, like the detector 104, the selector 106 can be configured to apply the slope crossing algorithm to the plurality of audio channels, or corresponding audio signals 103, frame by frame, so that only the speech quality metrics that correspond to a particular audio frame of the audio signals 103 are used to determine the best candidate selection(s) for that frame.

In embodiments, the selector 106 may be configured to operate without using a priori knowledge, such that the make-up, or composition, of the audio channels categorized as speech and those categorized as noisy may change dynamically, for example, as the various sound sources start and/or stop making sounds over time. Moreover, the number of accepted channels (e.g., speech lobes) and the number of rejected channels (e.g., noisy lobes) may dynamically change from one audio frame to the next as the captured sounds vary between speech conditions, quiet conditions, and/or noisy conditions. For example, the selector 106 may identify a wider candidate group, or a larger number of accepted channels, during quiet conditions because the detector 104 will output numerically similar harmonicity values across all channels when little to no audio is detected. As another example, the selector 106 may identify a narrower candidate group, or a smaller number of accepted channels, when noise interference is detected because lobes with poor speech to noise ratio tend to have significantly lower harmonic levels and thus, can be easily differentiated from lobes (or channels) containing speech audio.

As shown in FIG. 2, the selector 106 can be further configured to generate a disadvantage signal for each audio signal 103 that represents the best candidate selection ("BCS") outcome for that signal 103. The selector 106 can be further configured to provide the disadvantage signals, or other BCS output, to corresponding input channels of the audio processor 108, such as, for example, input data channels of the audio mixer 110, as shown in FIG. 3. In various embodiments, the disadvantage signal may be a control signal, or the like, configured to identify the corresponding audio signal 103 as speech audio or noise audio, or otherwise tell the audio mixer 110 whether to gate off the corresponding audio channel at the audio mixer 110. For example, the selector 106 may set the disadvantage signal to "0" if the audio signal is identified as comprising speech audio and to "1" if the audio signal is identified as comprising noise audio, or not comprising speech audio, or vice versa.

The audio processor 108 can be any type of processor capable of combining the audio signals 103 as described herein and removing the noise mix from the mixed audio output, or otherwise implementing the techniques described herein. In various embodiments, the audio processor 108 may be an audio signal processor, a digital signal processor ("DSP"), a digital signal processing component that is implemented in software, or any combination thereof. In some embodiments, the audio processor 108 may be, or may be included in, an aggregator configured to aggregate or collect data and/or audio from various components of the audio system 100 and apply appropriate processing techniques to the collected data and/or audio in accordance with the techniques described herein.

The audio mixer 110 (also referred to herein as a "first mixer") can be an automixer or any other type of mixer configured to generate a mixed audio output signal that conforms to a desired audio mix, such that audio signals from certain microphones, or microphone lobes, are emphasized while audio signals from others are deemphasized or suppressed. Exemplary embodiments of audio mixers are disclosed in commonly-assigned patents, U.S. Pat. Nos. 4,658,425, 5,297,210, and 11,302,347, each of which is incorporated by reference in its entirety herein. As shown in FIG. 3, the audio mixer 110 receives the plurality of audio signals 103 captured by the microphone 102 at corresponding input audio channels and receives the BCS outputs (or disadvantage signals) from the selector 106 at corresponding input data channels. Each of these channels is provided to an audio mixing module 118 configured to generate a mixed audio output that includes the audio signal(s) that are received at the input audio channel(s) identified as containing human speech by the selector 106, or otherwise gated on.

In some embodiments, all of the input audio channels may be gated on as a default, and the audio mixing module 118 may be configured to gate off, or reduce the strength of the audio signal in, any input audio channel that contains noise audio, or does not contain speech audio, according to the disadvantage signal for that channel. In other embodiments, all of the input audio channels may be gated off as a default, and the audio mixing module 118 may be configured to gate on, or allow with little or no suppression the audio signal in, any input audio channel that contains human speech audio, according to the disadvantage signal for that channel. In either case, the audio mixer 110 can generate the mixed audio output using only the contributions from the input audio channels that are gated on and excluding all other channels. As shown, the audio mixer 110 provides the mixed audio output to the source remover 114.

In some embodiments, the audio system 100 further comprises the channel selector 116 to apply pre-mixing gating decisions to the audio channels of the microphone 102 and/or the input audio channels of the selector 106. The channel selector 116 can be an automixer, pre-mixer, or other audio mixer configured to gate off one or more of the audio channels based on one or more criteria, so that any audio signals 103 included in those channel(s) are not analyzed by the selector 106 for best candidate selection, or included in the mixed audio output generated by the audio mixer 110. In some embodiments, though not shown, the channel selector 116 may be configured to provide its gating decisions to the detector 104 as well, so that the channel(s) gated off by the channel selector 116 are not analyzed by the detector 104 either. The criteria used by the channel selector 116 to gate off the one or more channels may include a signal level of the audio signals (e.g., basic level measure ("BLM") or the like), avoidance of feedback in the microphone output, and others. In some embodiments, the channel selector 116 and the audio mixer 110 may be combined into one device or processor, i.e. the audio processor 108. In other embodiments, the channel selector 116 may be a separate component of the audio system 100, as shown.

The noise mixer 112 (also referred to herein as a "second mixer") can be configured to generate and output a noise mix comprising the contributions, or audio signals, from the audio channel(s) identified as containing noise audio, or non-speech audio. For example, as shown in FIG. 1, the noise mixer 112 may be configured to receive the BCS outputs, or disadvantage signals, from the selector 106, as well as the plurality of audio signals 103 from the microphone 102, at corresponding channels. As shown in FIG. 4, the noise mixer 112 may include a noise logic module 120, or other suitable algorithm, configured to determine which of the audio signals 103 have been identified as containing noise, or non-speech audio, based on the disadvantage signals received from the selector 106. The noise logic module 120 can be further configured to provide or output only the "noisy" audio signals 103 to a matrix mixer 122 also included in the noise mixer 112 for summing together the noisy signals. As an example, in the illustrated embodiment, the noise logic module 120 determined, based on the disadvantage signals, that the audio signals 103 captured by microphone lobes 1, 3, 7, and 8 contain noise audio, and provided only those audio signals 103, i.e. the audio signals 103 received at channels 1, 3, 7, and 8, to the matrix mixer 122. The matrix mixer 122 can be configured to sum or combine the audio signals 103 received from the noise logic module 120, or otherwise identified as noisy signals, to generate a noise mix. The matrix mixer 122 can be any type of summer or other mixer for combining audio signals, as will be appreciated. As shown in FIG. 1, the noise mixer 112 provides the noise mix to the source remover 114.

The source remover 114 can be configured to reduce the effects of "cross-coupling" between two or more microphones (or microphone lobes) of the microphone 102, or otherwise remove off-axis noise that bleeds into the mixed audio output. As shown in FIG. 6, cross-coupling, or off-axis bleeding, may occur in an exemplary environment 200 when a given sound source (e.g., Source B) is audible in an audio signal captured by a microphone lobe (e.g., Lobe A) directed towards a different sound source (e.g., Source A). For example, in embodiments, assuming Source B is identified as a noise source and Source A is identified as a speech source by the selector 106, the mixed audio output generated by the audio mixer 110 may not directly contain the noisy signal captured from Source B by Lobe B, since the channels corresponding to noisy lobes (e.g., Lobe B) are gated off by the audio mixer 110. However, at least some of the noise audio from Source B may still be audible in, or bleed into, the mixed audio output due to cross-coupling between Lobes A and B, or off-axis detection of Source B by Lobe A. That is, the audio signal captured by Lobe A may include speech audio generated by Source A, as well as off-axis noise from Source B, even though Lobe A is directed towards Source A, not Source B. In such cases, the source remover 114 can be configured to remove the noise audio generated by Source B from the audio signal captured by Lobe A.

More specifically, according to embodiments, the source remover 114 can leverage the directivity of the microphone 102 (or its microphone lobes) to remove off-axis noise from the mixed audio output. For example, the source remover 114 can be configured to generate a mask based on the noisy lobes, or the noise mix generated by the noise mixer 112, and apply that mask (or "noise mask") to the mixed audio output generated based on the speech lobes, so that any off-axis noise stemming from the noisy lobes is removed from the mixed audio output. In various embodiments, the source remover 114 may be configured to calculate the mask based on a ratio of the mixed audio output to the noise mix and multiple the mixed audio output by the mask value to obtain an output without off-axis noise. As an example, the mask may have any value in the range of about zero (i.e. full mask is applied) to about one (i.e. no mask is applied). The source remover 114 may also be configured to further calculate the mask by applying a scaling factor to the ratio of the mixed audio output to the noise mix, wherein the scaling factor is configured to determine an aggressiveness of the mask. In addition, in some cases, the amount of removal applied to certain frequency bands of the mixed audio output can be tailored according to a known beamforming rejection at those frequency bands. In some embodiments, the source remover 114 can be used to achieve source separation, in addition to, or instead of, removing noisy sources from the output of the microphone 102. These and other aspects of the mask will be described in more detail below in accordance with exemplary embodiments. However, it should be appreciated that, other embodiments may use other types of masks, and/or any other combination of the techniques described herein, to remove off-axis noise from the microphone output.

Figure 5:
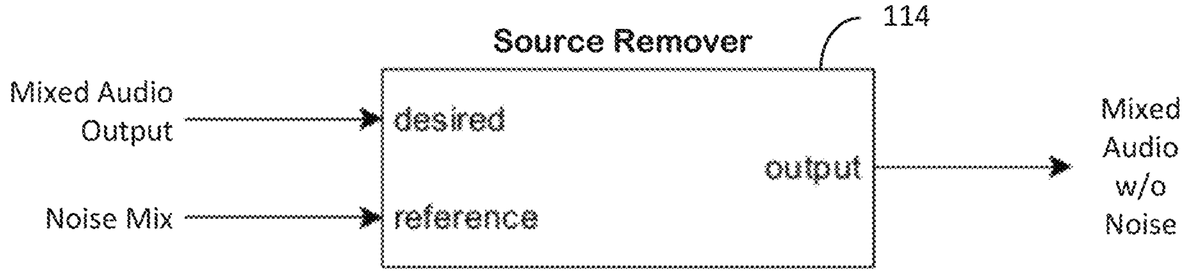
FIG. 5 is a schematic diagram of an exemplary source remover included in the system of FIG. 1, in accordance with one or more embodiments.

Referring now to FIG. 5, the source remover 114 can be configured remove, from a desired signal, d, off-axis noise resulting from a reference signal, r, bleeding into the desired signal. As shown, the source remover 114 includes a first input for receiving the desired signal (e.g., the mixed audio output from the audio mixer 110), a second input for receiving the reference signal (e.g., the noise mix from the noise mixer 112), and an output for providing a corrected version of the desired signal, dr (e.g., the mixed audio output without off-axis noise). The source remover 114 can be configured to take a ratio of d to r and apply that ratio as a gain, or "mask," to the desired signal, d, to obtain the corrected signal dr. In other words, at a given time, n, the source remover 114 can remove the reference signal noise from the desired signal by using a noise removal formula dr[n]=d[n] *(d[n]/r[n]), or dr[n]=d[n] *m[n], where m is a mask value equal to d/r. According to embodiments, the mask value m can be capped at one (i.e. no mask is applied) and floored at zero (i.e. full mask is applied).

According to embodiments, the source remover 114 can be configured to obtain a squared norm of the desired signal and of the reference signal for use as the d and r values, respectively, in the noise removal formula. In addition, the source remover 114 can be configured to operate in the frequency domain, like the other components of the audio system 100, such that the noise removal formula is applied to individual bins of a Fast Fourier Transform (FFT) of the audio signals. In some cases, the mask may be applied to each bin of the FFT, wherein the FFT includes a total of N bins. In other cases, the mask may be applied to only the positive frequency bins of the FFT, or to a total of N/2+1 bins, as will be appreciated.

In various embodiments, each bin used by the source remover 114 has an associated "crossover" threshold, c, that defines the point where the mask switches between positive gain and negative gain. For example, in a given sub-band, if d equals g*r, then the desired-to-reference ratio (i.e. d/r) is equal to g, and pre-multiplying the mask by 1/g ensures a mask value of 1, or 0 decibels (dB). In such cases, since g is the point where the mask switches between positive gain and negative gain, the crossover threshold c can be set to 1/g, and the mask value, m, can be set to c*(d/r). Thus, the above noise removal formula, dr[n]=d[n] *m[n], becomes dr[n]=d[n] *c*(d[n]/r[n]), or dr[n]=d[n] *(1/g)*(d[n]/r[n]). In embodiments, the crossover threshold c and/or its denominator g can be pre-determined or set during tuning or setup, for example, by an operator of the audio system 100. In some cases, the crossover threshold may be adaptive depending on one or more criteria, such as, for example, room size, desired gain amount, reverberations in the environment, relative sound levels during times of quiet, and more.

In general, the noise removal formula causes the source remover 114 to output a corrected microphone signal dr that is attenuated, as compared to a desired signal d (or mixed audio output), when the mask value m is less than unity, for example, due to the desired signal d dropping to less than g times higher than the reference signal r. In some embodiments, the crossover threshold c can be configured to have a more significant and/or tailored impact on the performance of the source remover 114, for example, in order to adjust the mask based on known beamforming rejection criteria. In one embodiment, the source remover 114 is configured to set g, or the denominator of the crossover threshold c, to a value of one for the lowest frequency band and to a value of thirty-two or higher for higher frequency bands, with a gradient of values therebetween. For example, the g value may be configured to smoothly or evenly transition from 1 to 32 for frequencies in the 0 to 9 kilohertz (kHz) range, where human speech is likely to present, and from 32 to 1000 for frequencies in the 9 kHz to 24 kHz range, where speech is not likely to be present, but noise may still be present. Thus, the mask can be tailored to be more aggressive, or provide more attenuation, in the bandwidths that are not likely to contain speech audio. In other embodiments, the source remover 114 may be tailored according to other frequency bands and/or ranges of the mixed audio output.

In some embodiments, the source remover 114 is configured to scale an aggressiveness of the noise removal from 0% (or no removal) to 100% (or full removal) by applying a scalar, x, to the mask value m. For example, the scalar x may be configured to have a value selected from a range of zero to one, and a modified mask value, y, may be calculated using a formula y=(1−m)*x+m. In such cases, the modified mask value may be applied to the desired signal d to obtain the corrected microphone output dr, i.e. using the formula dr=d*y, or dr=d*((1−m)*x+m). As will be appreciated, when the scalar x equals zero, the modified mask value y becomes equal to the mask value m and thus, the full mask is applied to the desired signal d (i.e. dr=d*m). And when the scalar x equals one, the modified mask value y becomes one, which means the gain is set to one and no mask is applied to the desired signal d (i.e. dr=d). In some cases, the scalar x may be automatically selected by the source remover 114. In other cases, the scalar x may be a user-selected value that is provided to the source remover 114 via a user interface of the audio processor 108 or other data input device of the audio system 100. In one exemplary embodiment, the user inputs a value v between zero and one, and the source remover 114 is configured to flip the value v using the formula x=1−v, so that a user input of "0" means no removal and a user input of "1" means full removal, when applied to the mask value m.

In other embodiments, the aggressiveness of the mask may be scaled by raising the mask value m to an exponent. In such cases, the exponent may be a scalar s, and the modified mask value may be equal to $m^s$. Since the mask value m is a value less than or equal to one, the aggressiveness of the mask may be increased by setting the scalar s to a value above one and may be decreased by setting the scalar s to a value below one.

In some embodiments, noise removal by the source remover 114 may be most or more effective when an angular separation between the noise source and the speech source is within a predetermined range, such as, e.g., 90 to 180 degrees, or 120 to 180 degrees, etc. If the noise source and the speech source are too close together, for example, when the angular separation is significantly less than the predetermined range (e.g., less than 90 degrees, less than 45 degrees, less than 30 degrees, etc.), the source remover 114 may have difficulty distinguishing one source from the other. In such cases, the source remover 114 may be configured to increase the aggressiveness of the source remover 114, e.g., via the scalar x, to compensate for the minimal separation.

The source removal techniques described herein can be used for removal of noisy sources from audio signals captured in a conference room, or other environment with multiple participants positioned at multiple microphones, or in any other noisy environment. For example, the source removal techniques may be used to remove background noise during a live audio stream or other event occurring in an environment with an overhead speaker system (e.g., at a convention center with music or audio playing through the public address ("PA") system). In such scenarios, a first microphone can be directed toward the desired audio source (e.g., the live streamer), a second microphone can be placed near one of the overhead speakers, and the source remover 114 can be used to remove the background audio captured by the second microphone from the desired audio captured by the first microphone using the techniques described herein.

In some embodiments, the source remover 114 can also be configured to achieve source separation, or isolation, for the audio signals received from the microphone 102. For example, using the techniques described herein, the source remover 114 can separate a first audio signal corresponding to a first audio source from a second audio signal corresponding to a second audio source, i.e. remove the second audio signal from the first audio signal, and vice versa. One exemplary use case is a music setting where a group of musicians (e.g., A, B, and C) are positioned in the same physical space, or in close proximity, and have a separate microphone directed towards each musical instrument (or musician if producing vocals). Typically, the music of one instrument (e.g., A) will bleed into the microphones of the other instruments (e.g., B and C) due to the close proximity. The source remover 114 can be used to effectively isolate each audio source, or microphone, by removing the audio bleed captured by each of the microphones. For example, the source remover 114 can be configured to mix the audio captured by microphones B and C and remove that audio mix (e.g., B+C) from the audio captured by microphone A; mix the audio captured by microphones A and C and remove that audio mix (e.g., A+C) from the audio captured by microphone B; and mix the audio captured by microphones A and B and remove that audio mix (e.g., A+B) from the audio captured by microphone C. Accordingly, the source remover 114 can produce an audio output that does not sound as if the musicians are playing in the same physical space. Similar source isolation techniques can be used for speech produced in the same physical space, for example, in a podcasting context, where multiple human speakers are using separate microphones and are seated close enough to have audio bleeding.

Figure 7:
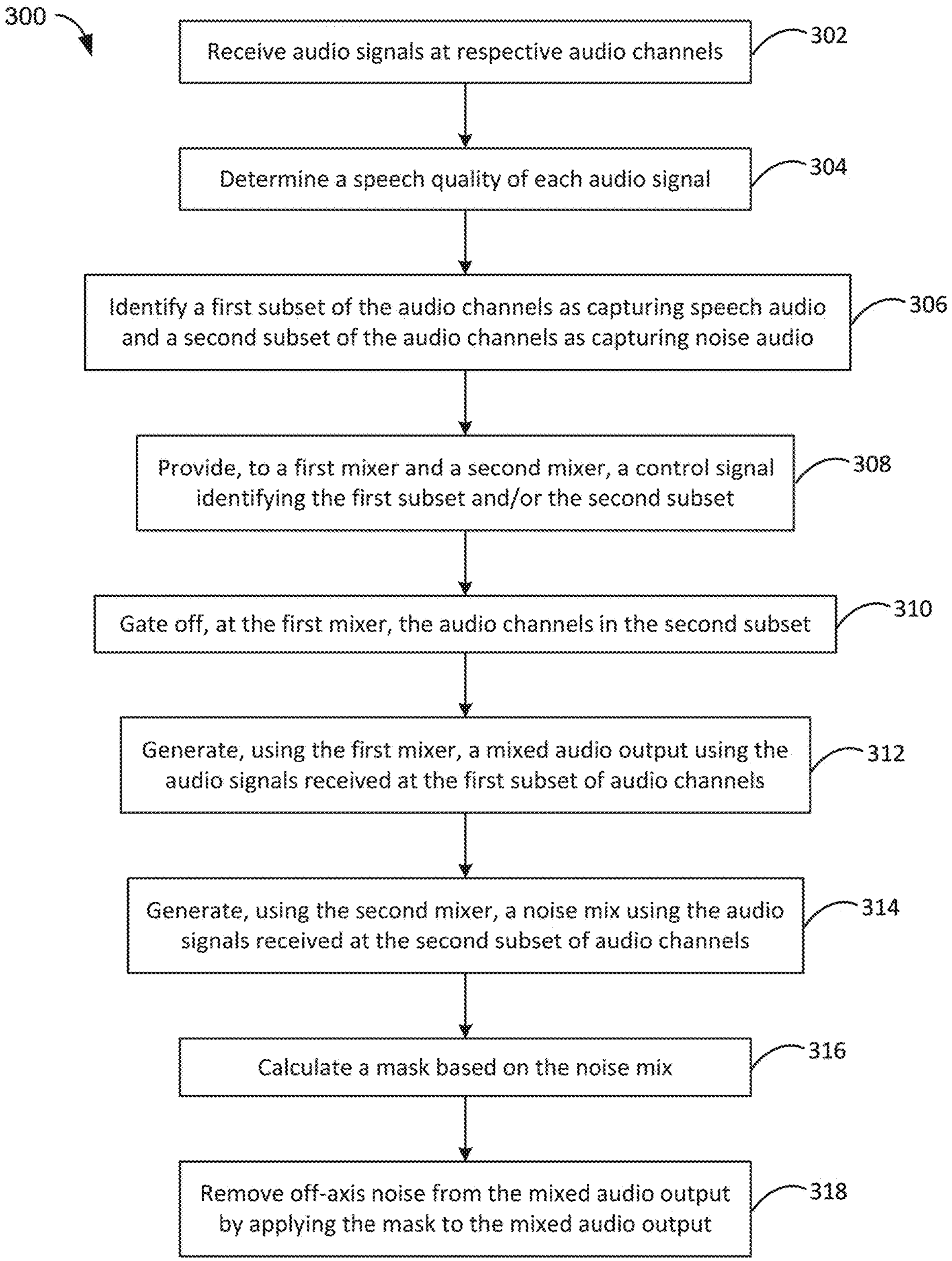
FIGS. 7 to 10 are flowcharts illustrating exemplary operations for optimizing audio mixing using the system of FIG. 1, in accordance with one or more embodiments.
Figure 8:
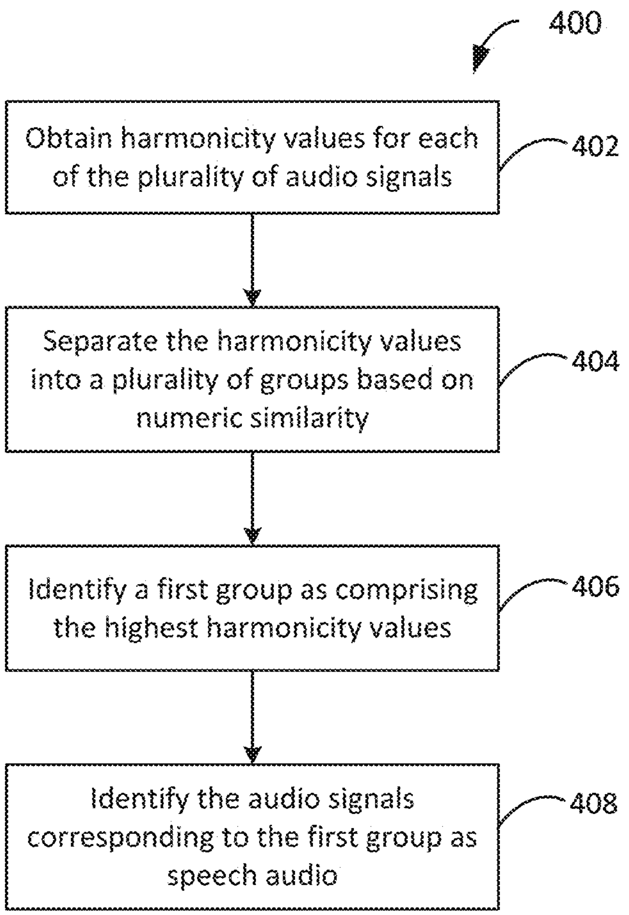
Figure 9:
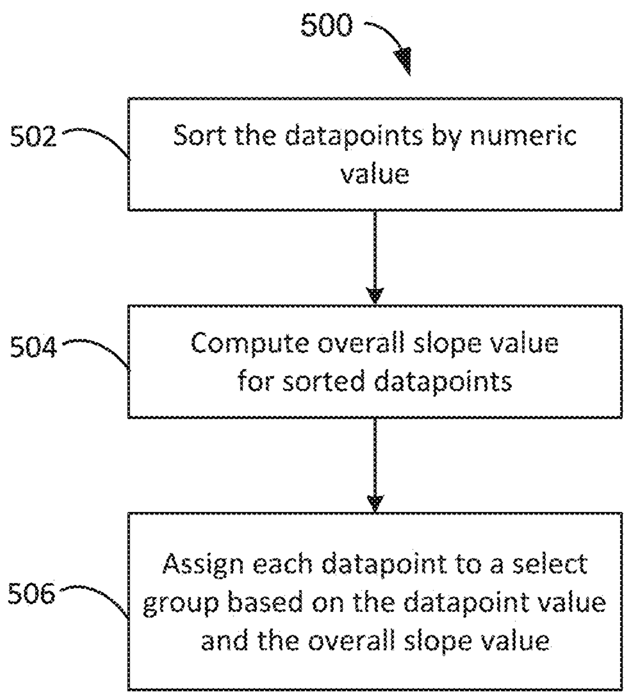
Figure 10:
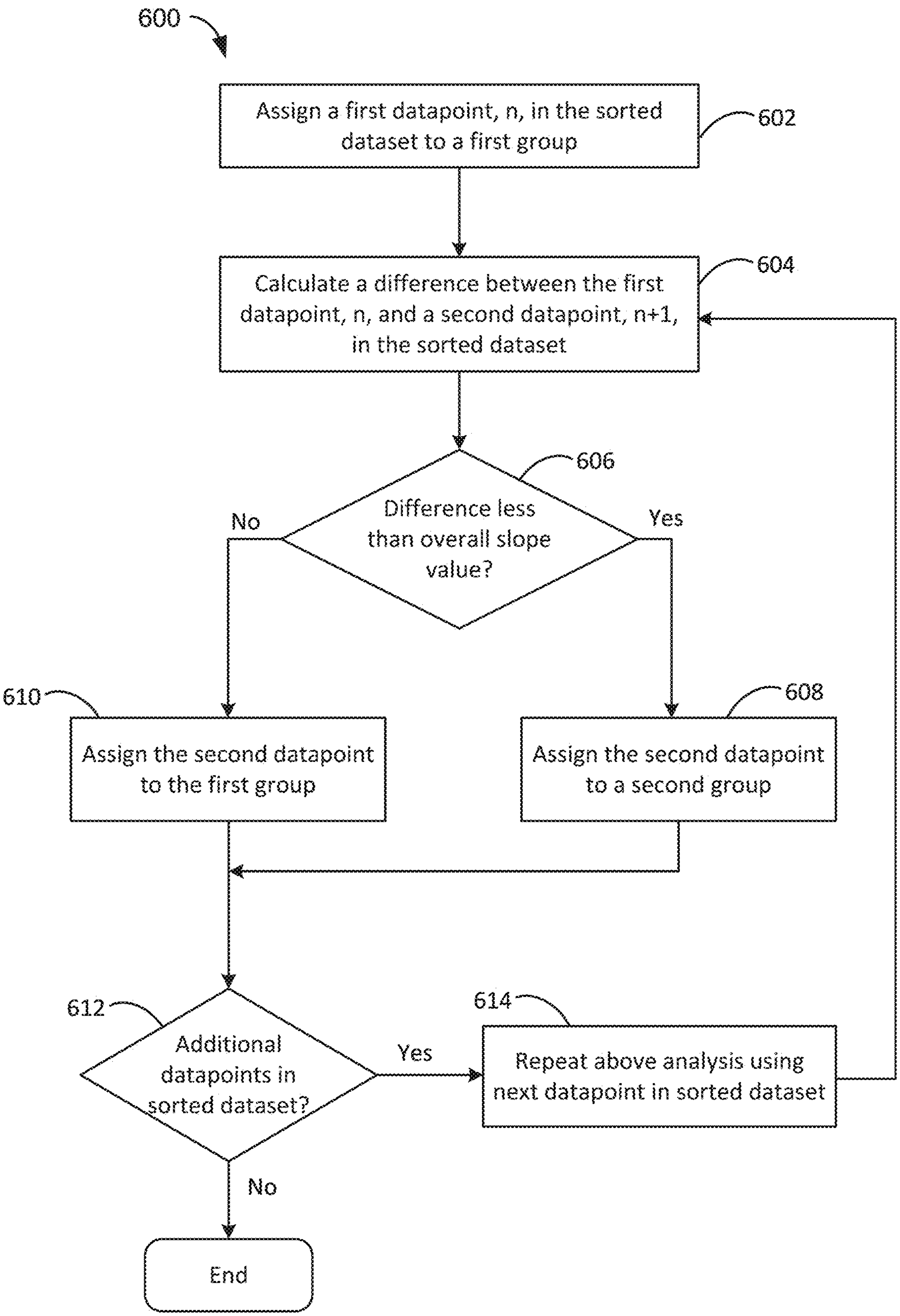

Referring now to FIGS. 7 to 10, shown are exemplary operations for carrying out various aspects of the optimized audio mixing techniques described herein, in accordance with embodiments. In particular, FIG. 7 shows an overall method or process 300 for optimizing audio mixing using at least one processor in communication with one or more microphones. FIG. 8 depicts a method or process 400 for selecting the best candidate(s) for speech audio that may be included in the process 300, for example, at step 306. FIG. 9 depicts a method or process 500 for implementing a slope crossing technique that may be included in the process 400, for example, at step 404. And FIG. 10 depicts a method or process 600 for grouping datapoints in accordance with the slope crossing technique that may be included in the process 500, for example, at step 506 of the process 500.

In embodiments, any one or all of the processes 300, 400, 500, and 600 may be implemented using an audio system, such as the audio system 100 shown in FIG. 1 or substantially similar thereto. For ease of explanation, the processes 300, 400, 500, and 600 will be described below with reference to the audio system 100 of FIG. 1, though it should be appreciated that each of the processes 300, 400, 500, and 600 may also be implemented using other audio systems or devices. In embodiments, one or more processors and/or other processing components within the audio system 100 may perform any, some, or all of the steps of each of the processes 300, 400, 500, and 600. For example, one or more of the processes 300, 400, 500, and 600 may be implemented using a digital signal processing ("DSP") component having a plurality of audio channels for respectively receiving a plurality of audio signals captured by the one or more microphones. The DSP component may be included in, or integral to, the one or more microphones (e.g., microphone 102 in FIG. 1) and/or one or more other components of the audio system. In some embodiments, one or more of the processes 300, 400, 500, and 600 may be carried out by a computing device included in the audio system, or more specifically a processor of said computing device executing software stored in a memory. In some cases, the computing device may further carry out the operations of one or more of the processes 300, 400, 500, and 600 by interacting or interfacing with one or more other devices that are internal or external to the audio system 100 and communicatively coupled to the computing device. One or more other types of components (e.g., memory, input and/or output devices, transmitters, receivers, buffers, drivers, discrete components, etc.) may also be utilized in conjunction with the processors and/or other processing components to perform any, some, or all of the steps of one or more of the processes 300, 400, 500, and 600.

Referring initially to FIG. 7, the process 300 begins at step 302 with receiving, at each of a plurality of audio channels, a respective one of a plurality of audio signals captured by the one or more microphones. For example, the one or more microphones (e.g., the microphone 102 in FIG. 1) may be configured to provide the captured audio signals to respective audio channels of the DSP component included in the audio system. The process 300 may also include, at step 304, dynamically determining a speech quality of each of the plurality of audio signals captured by the one or more microphones. In embodiments, step 304 may be carried out by a voice activity detector of the audio system (e.g., the detector 104 of FIG. 1) or other speech quality detection device configured to receive the plurality of audio signals from the one or more microphones via respective audio channels; determine, in real time (or nearly real time), whether each audio signal contains human speech or voice; and output a speech quality determination metric for each of the plurality of audio signals.

The process 300 further comprises, at step 306, based on a speech quality determination for each of the plurality of audio signals, identifying, in real time (or nearly real time), a first subset of the plurality of audio channels as capturing speech audio, and a second subset of the plurality of audio channels as capturing noise audio, wherein the first subset comprises one or more audio channels from the plurality of audio channels, and the second subset comprises one or more other audio channels from the plurality of audio channels. In embodiments, step 306 may be carried out, at least in part, by a best candidate selector (e.g., the selector 106 in FIG. 1), a channel selector, or any other component of the audio system configured to receive respective speech quality determinations for each of the plurality of audio signals from a voice activity detector, or the like, and based thereon, determine which of the audio signals is most likely to be, or the best candidate for, speech audio. As an example, the speech quality determinations may be harmonicity values or other speech quality metrics generated by the detector.

Referring additionally to FIG. 8, shown is an exemplary method or process 400 for carrying out all or a portion of step 306, or otherwise determine which of the audio signals captured by the one or more microphones is most likely to be, or the best candidate for, speech audio, in accordance with some embodiments. For example, the selector may be configured to perform or carry out the steps of process 400 in order to identify a first subset of the plurality of audio channels as capturing speech audio based on the speech quality determination for each of the plurality of audio signals. In other embodiments, the selector may be configured to use any other suitable technique for identifying the audio signal(s) that are most likely to contain speech audio.

As shown in FIG. 8, the process 400 begins at step 402 with obtaining respective harmonicity values for the plurality of audio signals. As described herein, a harmonicity value, or other speech quality metric, may be obtained, or received, from the detector for each of the plurality of audio signals. The process 400 further includes, at step 404, separating the respective harmonicity values into a plurality of groups based on numeric similarity.

Referring additionally to FIG. 9, shown is an exemplary method or process 500 for carrying out all or a portion of step 404 (e.g., using the selector 106), or otherwise implementing a slope crossing technique that separates a plurality of values into two or more groups based on numeric similarity, to help identify the best candidate selections at step 306, in accordance with some embodiments. In other embodiments, the selector may be configured to use any other suitable technique for separating the harmonicity values into different groups for making best candidate selections.

As shown in FIG. 9, the process 500 begins at step 502 with sorting the harmonicity values, or datapoints, by numeric value. In some embodiments, each datapoint includes an index number and a value number (i.e. an index/value pair), and the datapoints (collectively referred to as a "dataset") are sorted based on the value number. The index number may be an arbitrary identifier (i.e. with no relationship to the value number). In some cases, the index number may be a whole number that represents the audio channel on which the audio signal was received. For example, if there are eight audio channels, the index numbers may range from one to eight. The value number may be the harmonicity value, or other speech quality metric, assigned to the audio signal by the detector. The datapoints, or more specifically, the value numbers, may be sorted in ascending or descending order. While this disclosure only describes a scenario in which the datapoints are sorted in descending order for the sake of brevity, it will be appreciated that similar techniques may be used for datapoints sorted in ascending order, after making appropriate modifications to the process (e.g., by reversing the comparison direction of step 606 in FIG. 10).

The process 500 further includes, at step 504, computing an overall slope value for the sorted datapoints. For example, if the value numbers were plotted on a graph, the overall slope value is the slope of a line drawn on the graph to link the highest value number ("max val") to the lowest value number ("min val"). Since this line slopes downwards, the overall slope value will be a negative number, as will be appreciated. In various embodiments, the overall slope value may be equal to [(min val)−(max val)]/(total num−1), where "total num" is the total number of datapoints in the dataset. In some embodiments, the dataset includes at least three datapoints (i.e. num of datapts≥3) in order to allow computation of the overall slope value.

The process 500 also includes, at step 506, assigning each datapoint to a select group based on the datapoint value (or value number) and the overall slope value for the sorted dataset. In embodiments, the selector may implement step 506 by comparing the datapoints to the overall slope value and grouping the datapoints together based on a likeness of values, or numeric similarity, relative to the overall slope value, such that each group includes datapoint values that are similar each other, but significantly or noticeably different from that of the other groups. In this manner, and because the datapoints contain harmonicity values, the selector can distinguish the audio signals (or corresponding harmonicity values) that contain speech audio from those that contain noise audio.

More specifically, and referring additionally to FIG. 10, shown is an exemplary method or process 600 for carrying out all or a portion of step 506 (e.g., using the selector 106), or otherwise assigning each datapoint to a select group based on the datapoint value and the overall slope value, in accordance with the slope crossing technique. In other embodiments, the selector may be configured to use any other suitable technique for grouping the datapoints based on numeric similarity.

In general, the slope crossing technique may be used to group together datapoints that are considered numerically similar to each other when compared to the overall slope value and thus, separate out the datapoints that are significantly different. To make this determination, the slope crossing technique includes calculating a slope, or difference, between a given datapoint and the immediately preceding datapoint in the sorted dataset and comparing that difference to the overall slope value. For datasets sorted in descending order, the given datapoint is deemed to be different from the preceding datapoint(s), and thus placed in a separate group, if this difference is less than the overall slope value. Conversely, the given datapoint is deemed to be numerically similar to the preceding datapoint(s), and thus placed in the same group, if the difference is not less than the overall slope value. Graphically speaking, a line drawn through the two consecutive datapoints will intersect the overall slope line when the difference between two consecutive datapoints is less than the overall slope value (i.e. since the overall slope value and the difference values are all negative numbers). This "slope crossing" can represent a point in the sorted dataset where the datapoint values diverge, or are numerically different enough to be grouped separately.

Figure 11A:
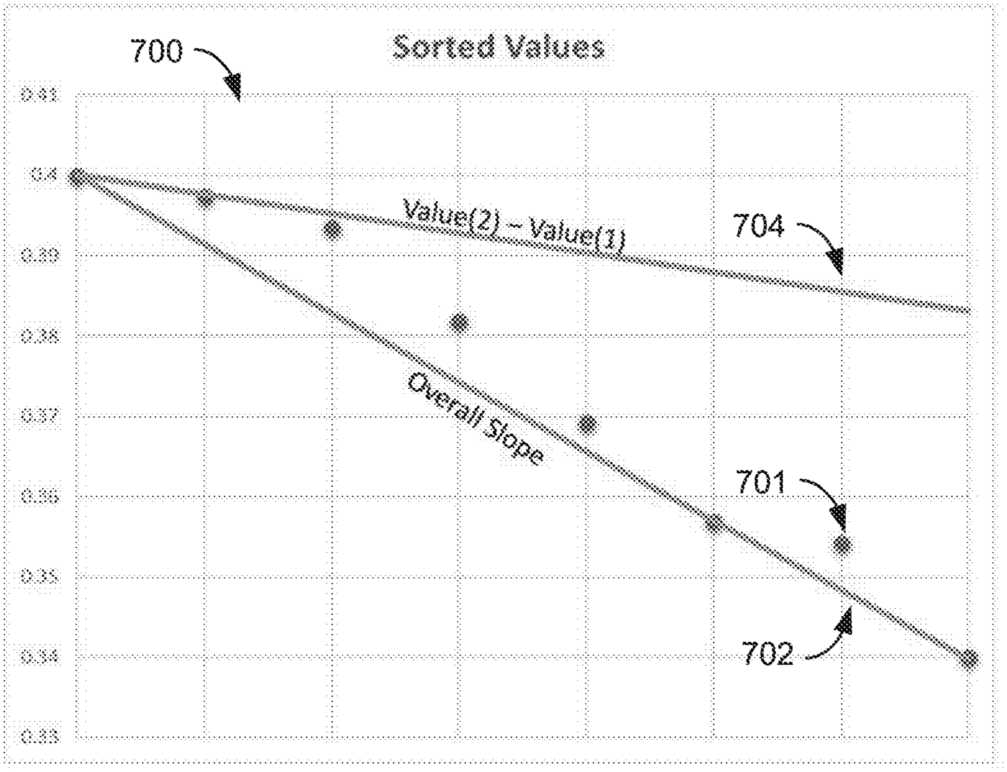
FIGS. 11A and 11B are exemplary plots graphically illustrating a slope crossing technique, in accordance with one or more embodiments.
Figure 11B:
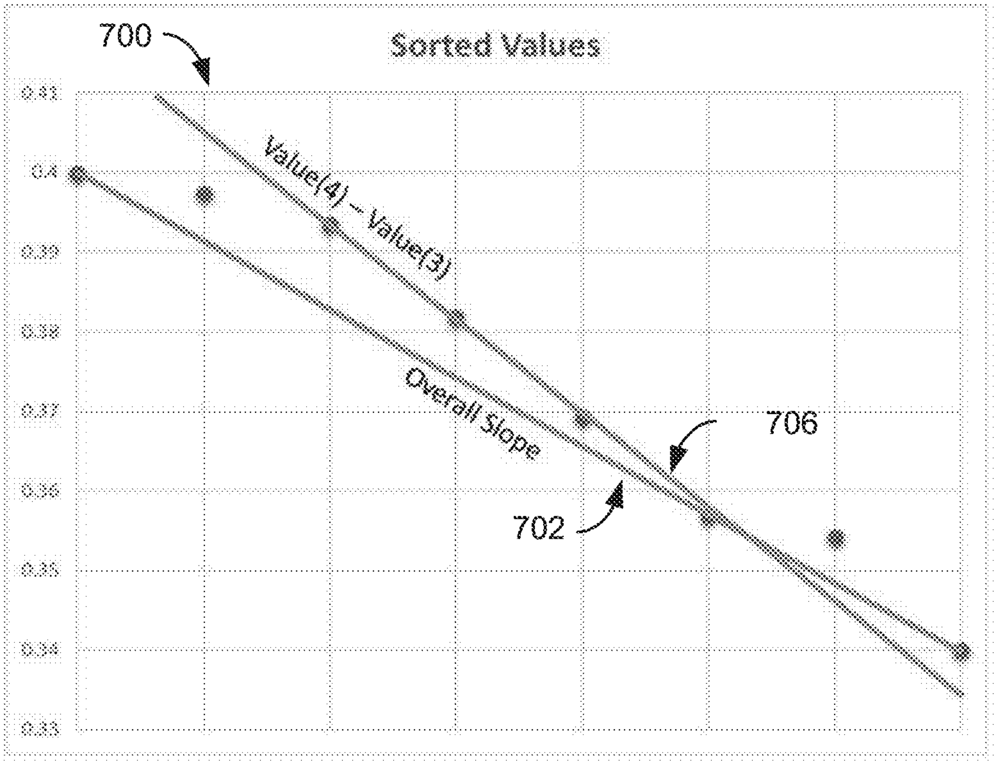

FIGS. 11A and 11B show an exemplary plot 700 that graphically illustrates the slope crossing technique, in accordance with embodiments. Plot 700 includes a plurality of datapoints 701 sorted in descending order (or greatest value to lowest value) and a first line 702 (or "overall slope line") that represents an overall slope calculated for the sorted dataset. In FIG. 11A, the plot 700 further includes a second line 704 (or "first slope line") that represents the difference between a first set of consecutive datapoints (e.g., Value[2]−Value [1]). As shown, the first slope line 704 does not cross the overall slope line 702 because the difference between the first set of datapoints is greater than the overall slope value. In FIG. 11B, the plot further includes a third line 706 (or "second slope line") that represents the difference between a second set of consecutive datapoints (e.g., Value [4]−Value [3]). As shown, the second slope line 706 crosses the overall slope line 702 because the difference between the second set of datapoints is less than the overall slope value.

More specifically, as shown in FIG. 10, the process 600 begins at step 602 with assigning a first datapoint, n, in the sorted dataset to a first group. For example, the first datapoint n may be the highest value number (or max val) in the dataset, if the datapoints are sorted in descending order. The process 600 further includes, at step 604, calculating a difference between the first datapoint n (e.g., Value[1] in FIG. 11A) and a second datapoint, n+1, in the sorted dataset, or the next consecutive datapoint in the sorted dataset (e.g., Value[2] in FIG. 11A). For example, the second datapoint n+1 may be the second highest value number in the dataset, if the datapoints are sorted in descending order. As will be appreciated, the difference value may be a negative number since the datapoints are sorted in descending order.

The process 600 also includes, at step 606, comparing the difference calculated at step 604 (e.g., the slope between the first pair of consecutive datapoints in the sorted dataset, or Value [2]−Value[1] in FIG. 11A) to the overall slope value. In embodiments where the datapoints are sorted in descending order, step 606 further includes determining if the difference is less than the overall slope value. In other embodiments, i.e. where the datapoints are sorted in ascending order, step 606 may instead include determining if the difference is greater than the overall slope value. In either embodiment, if the determination at step 606 is "yes", the process 600 continues to step 608, which includes assigning the second datapoint n+1 to a second group, different from the first group. And if the determination at step 606 is "no", the process 600 continues to step 610, which includes assigning the second datapoint n+1 to the first group, like the first datapoint n (e.g., as shown in FIG. 11A).

From steps 608 and 610, the process 600 continues to step 612, which includes determining whether the sorted dataset includes additional datapoints. If the determination at step 612 is "yes," the process 600 continues to step 614, which includes repeating the analysis of steps 604 to 612 using a next consecutive datapoint in the sorted dataset to determine whether that next datapoint should be added to the last-created group (e.g., the second group) or to a new group. In particular, the process 600 returns to step 604 to calculate the slope or difference between the next consecutive datapoint (e.g., a third datapoint, n+2) and the immediately preceding datapoint in the sorted dataset (e.g., the second datapoint n+1). Then, at step 606, the process 600 includes determining whether the difference between the new pair of datapoints is less than the overall slope value. If it is, at step 608, the process 600 includes assigning the next datapoint to a new group (e.g., a third group), for example, as is the case for Value [4] in FIG. 11B. If the next consecutive slope is not less than the overall slope value, the process 600 includes assigning the next datapoint to the last-created group (e.g., the second group). This analysis may continue in a loop until all datapoints in the dataset have been assigned to a select one of a plurality of groups based on a likeness of values, or numeric similarity, i.e. until the determination at step 612 is "no" and the process 600 can end.

Thus, the process 600 may be used to separate the datapoints into a plurality of groups. The exact number of groups created by the process 600 may vary depending on the datapoint values in the dataset. In cases where the dataset includes an outlier, or a value that widely differs from all of the other values, the plurality of groups may include only two groups, with the outlier being grouped separately from the rest of the values. In cases where the dataset includes a variety of values, the plurality of groups may include several groups (e.g., three or more groups). In some embodiments, when a given group includes a large number of datapoints, the process 600 may be iteratively repeated within that group, so that the datapoint values in the given group are further separated into sub-groups based on a likeness of values. In order to further narrow the range of possible candidates, this process may be repeated at the sub-group level as well, if needed, for example, until each group, or sub-group, includes no more than three datapoints. In some embodiments, the process 600 may be repeated until there are two sub-groups: a first group containing a maximum of three datapoints that are likely to be the best candidates for speech audio and a second group containing the remaining datapoints, which are likely to be noise interference audio.

Referring back to FIGS. 8 and 9, the process 500 and/or step 404 may be complete once all datapoints in the sorted dataset have been assigned to a select group at step 506, i.e. process 600 is complete. Once step 404 is complete, the process 400 continues to step 406, which includes identifying a first group of the plurality of groups as comprising the highest harmonicity values. In some embodiments, the first group formed during the process 600 may correspond to the group with the highest harmonicity values, if the dataset is sorted in descending order. If the process 600 has been run multiple times in order to form sub-groups, for example, the values in each of the sub-groups may be compared to each other to determine which group, or sub-group, includes the highest harmonicity values.

The process 400 also includes, at step 408, identifying, as speech audio, the audio signals corresponding to the harmonicity values in the first group. Once one or more of the audio signals are identified as containing speech audio at step 408, the process returns to step 306, where the identified audio signal(s) are used to determine which of the plurality of audio channels correspond to speech audio. For example, the selector may be configured to identify, as the first subset of the plurality of audio channels, the one or more audio channels that correspond to the one or more audio signals identified as speech audio in step 408. The selector may also be configured to identify, as the second subset of the plurality of audio channels, the remaining audio channels, or those channels that are not identified as capturing speech audio.

In various embodiments, the process 300 also includes, at step 308, providing, to a first mixer and a second mixer, a control signal identifying at least one of (a) the one or more other audio channels in the second subset or (b) the one or more audio channels in the first subset. The first mixer may be, for example, the audio mixer 110 in FIG. 1 or any other appropriate audio mixer or automixer, and the second mixer may be, for example, the noise mixer 112 shown in FIG. 1, or any other appropriate audio mixer. The control signal may be included in the output ("BCS output") that the selector 106 provides to the audio mixer 110 and the noise mixer 112, as shown in FIG. 1. In embodiments, the control signal may include one or more disadvantage signals configured to indicate which of the audio channels contains noise audio, or is not likely to contain speech audio, and thus, should be gated off, and which of the audio channels contains, or is most likely to contain, speech audio and therefore, should be gated on, as described herein and shown in FIGS. 2-4.

In various embodiments, the process 300 also includes, at step 310, gating off, at the first mixer, each of the one or more other audio channels in the second subset. For example, based on the control signal (or disadvantage signals) received from the selector, the first mixer can determine which of the audio channels are in the second subset identified at step 306, or otherwise contain noise audio, and can gate off each of the noisy or rejected channels. In such embodiments, the first mixer may be configured to keep each of its input audio channels gated on until instructed otherwise, for example, by the control signal. In other embodiments, for example, where the audio mixer keeps all audio channels gated off as a default, step 310 may include gating on each of the audio channels in the first subset and keeping the one or more other audio channels in the second subset gated off.

The process 300 further includes, at step 312, generating, using the first mixer, a mixed audio output that includes the audio signals received at the one or more audio channels in the first subset. In embodiments, since the audio channels in the second subset (e.g., the noisy channels) are gated off at step 310, the mixed audio output may be a mix of the audio signals received at all of the audio channels that are gated on.

The process 300 also includes, at step 314, generating, using the second mixer, a noise mix that includes the audio signals received at the one or more other audio channels in the second subset. For example, the second mixer may receive the audio signals from the one or more microphones and may use the control signal from the selector to determine which of those audio signals are noise audio and thus, should be included in the noise mix.

As shown in FIG. 7, the process 300 may also include, at step 316, calculating a mask based on a ratio of the mixed audio output to the noise mix. The process 300 further includes, at step 318, removing off-axis noise from the mixed audio output by applying, to the mixed audio output, the mask determined based on the noise mix (i.e. at step 316). In embodiments, the mask may be calculated by a source remover included in the audio system (e.g., source remover 114 of FIG. 1) and may be applied to the mixed audio output by the source remover as well, in order to remove any off-axis noise from the mixed audio output. In some embodiments, step 316 includes calculating the mask by applying a scaling factor to the ratio of the mixed audio output to the noise mix, wherein the scaling factor determines an aggressiveness of the mask, as described herein. In some embodiments, the mask has a value that ranges from about zero to about one, wherein a mask value of zero means the full mask is applied and a mask value of one means no mask is applied. The process 300 may end once step 318 is complete.

Thus, the techniques described herein can be used to improve or optimize audio mixing in a microphone system or other audio system by actively rejecting the audio channels (or microphone lobes) where noise interference occurs and reducing the number of accepted channels at times where both noise and speech occur concurrently, and by using the rejected audio to remove off-axis noise from a mix of all the accepted channels. In particular, the audio channels may be rejected or accepted based on gating decisions made by a best candidate selector that uses speech quality metrics to determine which of the audio channels are most likely to contain, or be the best candidates for, speech audio and/or which of the audio channels should be gated off. In addition, any off-axis noise or "leakage" into the accepted channels may be removed by applying a mask to the mix of accepted channels, wherein the mask is calculated by a source remover based on a ratio of the accepted or speech audio and the rejected or noise audio.

In some cases, the best candidate selection algorithm may be used in conjunction with other techniques for identify speech audio or otherwise differentiating noise audio from speech audio. For example, the audio system may be configured to apply two or more techniques and, from among the results, select the "best of the best," or the audio channel that is gated on most often between all of the techniques.

While this disclosure describes applying the slope crossing and/or best candidate selection techniques to audio signals, in other embodiments, these techniques may be used with other types of indicators or values that not entirely precise on their own, in order to select the "best candidates" for a particular situation.

The components of the audio system 100 may be implemented in hardware (e.g., discrete logic circuits, application specific integrated circuits (ASIC), programmable gate arrays (PGA), field programmable gate arrays (FPGA), digital signal processors (DSP), microprocessor, etc.), using software executable by one or more servers or computers, or other computing device having a processor and memory (e.g., a personal computer (PC), a laptop, a tablet, a mobile device, a smart device, thin client, etc.), or through a combination of both hardware and software. For example, some or all components of the microphone 102, the detector 104, the selector 106, the channel selector 116, and/or the audio processor 108 may be implemented using discrete circuitry devices and/or using one or more processors (e.g., audio processor and/or digital signal processor) executing program code stored in a memory (not shown), the program code being configured to carry out one or more processes or operations described herein, such as, for example, the methods shown in FIGS. 7 to 10. Thus, in embodiments, one or more of the components of the audio system 100 may include one or more processors, memory devices, computing devices, and/or other hardware components not shown in the figures.

All or portions of the processes described herein, including method 300 of FIG. 7, method 400 of FIG. 8, method 500 of FIG. 9, and method 600 of FIG. 10, may be performed by one or more processing devices or processors (e.g., analog to digital converters, encryption chips, etc.) that are within or external to the audio system 100 of FIG. 1. In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of the methods 300, 400, 500, and 600. As an example, in some embodiments, each of the methods described herein may be carried out by a processor executing software stored in a memory. The software may include, for example, program code or computer program modules comprising software instructions executable by the processor. In some embodiments, the program code may be a computer program stored on a non-transitory computer readable medium that is executable by a processor of the relevant device.

Any of the processors described herein may include a general purpose processor (e.g., a microprocessor) and/or a special purpose processor (e.g., an audio processor, a digital signal processor, etc.). In some examples, the processor(s) described herein may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

Any of the memories or memory devices described herein may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory described herein includes multiple kinds of memory, particularly volatile memory and non-volatile memory.

Moreover, any of the memories described herein may be computer readable media on which one or more sets of instructions can be embedded. The instructions may reside completely, or at least partially, within any one or more of the memory, the computer readable medium, and/or within one or more processors during execution of the instructions. In some embodiments, the memory described herein may include one or more data storage devices configured for implementation of a persistent storage for data that needs to be stored and recalled by the end user. In such cases, the data storage device(s) may save data in flash memory or other memory devices. In some embodiments, the data storage device(s) can be implemented using, for example, SQLite data base, UnQLite, Berkeley DB, BangDB, or the like.

Any of the computing devices described herein can be any generic computing device comprising at least one processor and a memory device. In some embodiments, the computing device may be a standalone computing device included in the audio system 100, or may reside in another component of the audio system 100, such as, e.g., the microphone 102, the audio processor 108, the best candidate selector 106, or the detector 104. In such embodiments, the computing device may be physically located in and/or dedicated to the given environment or room, such as, e.g., the same environment in which the microphone 102 is located. In other embodiments, the computing device may not be physically located in proximity to the microphone 102 but may reside in an external network, such as a cloud computing network, or may be otherwise distributed in a cloud-based environment. Moreover, in some embodiments, the computing device may be implemented with firmware or completely software-based as part of a network, which may be accessed or otherwise communicated with via another device, including other computing devices, such as, e.g., desktops, laptops, mobile devices, tablets, smart devices, etc. Thus, the term "computing device" should be understood to include distributed systems and devices (such as those based on the cloud), as well as software, firmware, and other components configured to carry out one or more of the functions described herein. Further, one or more features of the computing device may be physically remote and may be communicatively coupled to the computing device.

In some embodiments, any of the computing devices described herein may include one or more components configured to facilitate a conference call, meeting, classroom, or other event and/or process audio signals associated therewith to improve an audio quality of the event. For example, in various embodiments, any computing device described herein may comprise a digital signal processor ("DSP") configured to process the audio signals received from the various microphones or other audio sources using, for example, automatic mixing, matrix mixing, delay, compressor, parametric equalizer ("PEQ") functionalities, acoustic echo cancellation, and more. In other embodiments, the DSP may be a standalone device operatively coupled or connected to the computing device using a wired or wireless connection. One exemplary embodiment of the DSP, when implemented in hardware, is the P300 IntelliMix Audio Conferencing Processor from SHURE, the user manual for which is incorporated by reference in its entirety herein. As further explained in the P300 manual, this audio conferencing processor includes algorithms optimized for audio/video conferencing applications and for providing a high quality audio experience, including eight channels of acoustic echo cancellation, noise reduction and automatic gain control. Another exemplary embodiment of the DSP, when implemented in software, is the IntelliMix Room from SHURE, the user guide for which is incorporated by reference in its entirety herein. As further explained in the IntelliMix Room user guide, this DSP software is configured to optimize the performance of networked microphones with audio and video conferencing software and is designed to run on the same computer as the conferencing software. In other embodiments, other types of audio processors, digital signal processors, and/or DSP software components may be used to carry out one or more of audio processing techniques described herein, as will be appreciated.

Moreover, any of the computing devices described herein may also comprise various other software modules or applications (not shown) configured to facilitate and/or control the conferencing event, such as, for example, internal or proprietary conferencing software and/or third-party conferencing software (e.g., Microsoft Skype, Microsoft Teams, Bluejeans, Cisco WebEx, GoToMeeting, Zoom, Join.me, etc.). Such software applications may be stored in the memory of the computing device and/or may be stored on a remote server (e.g., on premises or as part of a cloud computing network) and accessed by the computing device via a network connection. Some software applications may be configured as a distributed cloud-based software with one or more portions of the application residing in the computing device and one or more other portions residing in a cloud computing network. One or more of the software applications may reside in an external network, such as a cloud computing network. In some embodiments, access to one or more of the software applications may be via a web-portal architecture, or otherwise provided as Software as a Service (SaaS).

In general, a computer program product in accordance with embodiments described herein includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described herein. In this regard, the program code may be implemented in any desired language, and may be implemented as machine code, assembly code, byte code, interpretable source code or the like (e.g., via C, C++, Java, ActionScript, Python, Objective-C, JavaScript, CSS, XML, and/or others). In some embodiments, the program code may be a computer program stored on a non-transitory computer readable medium that is executable by a processor of the relevant device.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding, or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Any process descriptions or blocks in the figures, such as, e.g., FIGS. 7 to 10, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be noted that in the description and drawings, like or substantially similar elements may be labeled with the same reference numerals. However, sometimes these elements may be labeled with differing numbers, such as, for example, in cases where such labeling facilitates a more clear description. In addition, system components can be variously arranged, as is known in the art. Also, the drawings set forth herein are not necessarily drawn to scale, and in some instances, proportions may be exaggerated to more clearly depict certain features and/or related elements may be omitted to emphasize and clearly illustrate the novel features described herein. Such labeling and drawing practices do not necessarily implicate an underlying substantive purpose. The above description is intended to be taken as a whole and interpreted in accordance with the principles taught herein and understood to one of ordinary skill in the art.

In this disclosure, the use of the disjunctive is intended to include the conjunctive. The use of definite or indefinite articles is not intended to indicate cardinality. In particular, a reference to "the" object or "a" and "an" object is intended to also denote one of a possible plurality of such objects.

This disclosure describes, illustrates, and exemplifies one or more particular embodiments of the invention in accordance with its principles. The disclosure is intended to explain how to fashion and use various embodiments in accordance with the technology rather than to limit the true, intended, and fair scope and spirit thereof. That is, the foregoing description is not intended to be exhaustive or to be limited to the precise forms disclosed herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The embodiment(s) provided herein were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally, and equitably entitled.

What is claimed is:

1. A method using at least one processor in communication with one or more microphones, the method comprising:

receiving, at each of a plurality of audio channels, a respective one of a plurality of audio signals captured by the one or more microphones;

determining a respective speech quality for each of the plurality of audio signals; identifying, in real time, a first subset of the plurality of audio channels as capturing speech audio based on the respective speech quality for each of the plurality of audio signals, wherein the first subset comprises one or more audio channels from the plurality of audio channels, and identifying, in real time, a second subset of the plurality of audio channels as capturing noise audio based on the respective speech quality for each of the plurality of audio signals, wherein the second subset comprises one or more other audio channels from the plurality of audio channels;

generating, using a first mixer, a mixed audio output that includes the audio signals received at the one or more audio channels in the first subset;

generating, using a second mixer, a noise mix that includes the audio signals received at the one or more other audio channels in the second subset; and removing off-axis noise from the mixed audio output by applying, to the mixed audio output, a mask determined based on the noise mix.

2. The method of claim 1, further comprising: calculating the mask based on a ratio of the mixed audio output to the noise mix.

3. The method of claim 1, further comprising: calculating the mask by applying a scaling factor to a ratio of the mixed audio output to the noise mix, the scaling factor determining an aggressiveness of the mask.

4. The method of claim 1, wherein the mask has a value that ranges from zero to one.

5. The method of claim 1, further comprising: providing, to the first mixer and the second mixer, a control signal identifying at least one of (a) the one or more other audio channels in the second subset or (b) the one or more audio channels in the first subset.

6. The method of claim 1, further comprising: gating off, at the first mixer, each of the one or more other audio channels in the second subset.

7. The method of claim 1, further comprising: dynamically determining the respective speech quality of each of the plurality of audio signals.

8. The method of claim 1, wherein identifying the first subset as capturing speech audio comprises:

obtaining respective harmonicity values for the plurality of audio signals;

separating the respective harmonicity values into a plurality of groups based on numeric similarity;

identifying a first group of the plurality of groups as comprising a highest harmonicity value; and identifying, as speech audio, the audio signals corresponding to the harmonicity values in the first group.

9. A system comprising:

at least one microphone configured to capture a plurality of audio signals from one or more audio sources and provide each of the plurality of audio signals to a respective one of a plurality of audio channels;

a detector communicatively couped to the at least one microphone and configured to determine a respective speech quality for each of the plurality of audio signals;

a selector communicatively coupled to the at least one microphone and the detector, the selector configured to identify, in real time, a first subset of the plurality of audio channels as capturing speech audio based on the respective speech quality for each of the plurality of audio signals, wherein the first subset comprising one or more audio channels from the plurality of audio channels, and identifying, in real time, a second subset of the plurality of audio channels as capturing noise audio based on the respective speech quality for each of the plurality of audio signals, wherein the second subset comprises one or more other audio channels from the plurality of audio channels;

a first mixer configured to generate a mixed audio output using the audio signals received at the one or more audio channels in the first subset;

a second mixer configured to generate a noise mix using the audio signals received at the one or more other audio channels in the second subset; and a source remover configured to remove off-axis noise from the mixed audio output by applying, to the mixed audio output, a mask determined based on the noise mix.

10. The system of claim 9, wherein the detector is included in the at least one microphone.

11. The system of claim 9, wherein the selector is included in the at least one microphone.

12. The system of claim 9, further comprising: an audio processor communicatively coupled to at least one of the selector or the at least one microphone, the audio processor comprising the first mixer, the second mixer, and the source remover.

13. The system of claim 9, wherein the source remover is further configured to calculate the mask based on a ratio of the mixed audio output to the noise mix.

14. The system of claim 9, wherein the source remover is further configured to calculate the mask by applying a scaling factor to a ratio of the mixed audio output to the noise mix, the scaling factor determining an aggressiveness of the mask.

15. The system of claim 9, wherein the selector is configured to provide a control signal to the first mixer and the second mixer identifying at least one of (a) the one or more other audio channels in the second subset or (b) the one or more audio channels in the first subset.

16. The system of claim 9, wherein the first mixer is configured to gate off each of the one or more other audio channels in the second subset.

17. The system of claim 9, wherein the selector is configured to identify the first subset as capturing speech audio by:

obtaining respective harmonicity values for the plurality of audio signals;

separating the respective harmonicity values into a plurality of groups based on numeric similarity;

identifying a first group of the plurality of groups as comprising a highest harmonicity value; and identifying, as speech audio, the audio signals corresponding to the harmonicity values in the first group.

18. A non-transitory computer-readable medium comprising instructions that, when executed by at least one processor, cause the at least one processor to perform:

receiving, at each of a plurality of audio channels, a respective one of a plurality of audio signals captured by one or more microphones;

determining a respective speech quality for each of the plurality of audio channels;

identifying, in real time, a first subset of the plurality of audio channels as capturing speech audio based on the respective speech quality for each of the plurality of audio signals, wherein the first subset comprises one or more audio channels from the plurality of audio channels, and identifying, in real time, a second subset of the plurality of audio channels as capturing noise audio based on the respective speech quality for each of the plurality of audio signals, wherein the second subset comprises one or more other audio channels from the plurality of audio channels;

generating, using a first mixer, a mixed audio output that includes the audio signals received at the one or more audio channels in the first subset;

generating, using a second mixer, a noise mix that includes the audio signals received at the one or more other audio channels in the second subset; and removing off-axis noise from the mixed audio output by applying, to the mixed audio output, a mask determined based on the noise mix.

19. The non-transitory computer-readable medium of claim 18, further comprising instructions that cause the at least one processor to perform: calculating the mask based on a ratio of the mixed audio output to the noise mix.

20. The non-transitory computer-readable medium of claim 18, further comprising instructions that cause the at least one processor to perform: calculating the mask by applying a scaling factor to a ratio of the mixed audio output to the noise mix, the scaling factor determining an aggressiveness of the mask.

* * * * *